United States Patent
Gupta et al.

(10) Patent No.: US 10,096,117 B2
(45) Date of Patent: Oct. 9, 2018

(54) VIDEO SEGMENTATION METHOD

(71) Applicant: CANON KABUSHIKI KAISHA, Tokyo (JP)

(72) Inventors: Amit Kumar Gupta, Epping (AU); Ashley John Partis, Liberty Grove (AU); David Kenji See, Artarmon (AU)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/975,228

(22) Filed: Dec. 18, 2015

(65) Prior Publication Data
US 2016/0189388 A1   Jun. 30, 2016

(30) Foreign Application Priority Data

Dec. 24, 2014 (AU) ................................. 2014280948

(51) Int. Cl.
| | |
|---|---|
| G06K 9/00 | (2006.01) |
| G06T 7/00 | (2017.01) |
| G06T 7/11 | (2017.01) |
| G06T 7/187 | (2017.01) |
| G06T 7/194 | (2017.01) |

(52) U.S. Cl.
CPC .............. *G06T 7/0081* (2013.01); *G06T 7/11* (2017.01); *G06T 7/187* (2017.01); *G06T 7/194* (2017.01); *G06T 2207/10024* (2013.01)

(58) Field of Classification Search
CPC ......... G06T 7/0081; G06T 2207/10004; G06T 2207/20144; G06T 2207/20141; G06K 9/6267; G06K 9/6201; G06K 9/6202
See application file for complete search history.

(56) References Cited

U.S. PATENT DOCUMENTS

| | | | |
|---|---|---|---|
| 5,969,755 | A | 10/1999 | Courtney |
| 6,731,805 | B2 | 5/2004 | Brodsky et al. |
| 6,961,447 | B2 | 11/2005 | Onuma et al. |
| 6,999,600 | B2 | 2/2006 | Venetianer et al. |
| 7,190,809 | B2 | 3/2007 | Gutta et al. |
| 7,860,311 | B2 | 12/2010 | Chen et al. |
| 8,300,890 | B1 * | 10/2012 | Gaikwad ................ H04N 5/144 382/103 |

(Continued)

OTHER PUBLICATIONS

Javed et al "A Hierarchical Approach to Robust Background Subtraction using Color and Gradient Information" Proceeding, Motion '02 Proceedings of the Workshop on Motion and Video Computing, p. 1-6, IEEE Computer Society Washington, DC, USA © 2002.

*Primary Examiner* — Li Liu
(74) *Attorney, Agent, or Firm* — Canon USA, Inc. I.P. Division

(57) ABSTRACT

A method for classifying a visual element in a video frame as either foreground or background, the video frame being characterized using a scene model comprising a plurality of modes, the method comprising the steps of: determining a blob boundary characteristic for a blob comprising at least the visual element; identifying a mode matched to the visual element; classifying the visual element and the matched mode as foreground dependent upon a match mode boundary characteristic of the matched mode; and updating the scene model dependent upon the blob boundary characteristic and the matched mode boundary characteristic.

18 Claims, 14 Drawing Sheets

(56) References Cited

U.S. PATENT DOCUMENTS

| | | | |
|---|---|---|---|
| 8,456,528 B2 | 6/2013 | Brown et al. | |
| 2004/0151342 A1* | 8/2004 | Venetianer | G06K 9/00624 |
| | | | 382/103 |
| 2007/0160289 A1* | 7/2007 | Lipton | G06K 9/00771 |
| | | | 382/173 |
| 2009/0060278 A1* | 3/2009 | Hassan-Shafique | G06K 9/00771 |
| | | | 382/103 |
| 2009/0222388 A1* | 9/2009 | Hua | G06K 9/00778 |
| | | | 706/12 |
| 2012/0106856 A1* | 5/2012 | Gupta | G06K 9/38 |
| | | | 382/224 |
| 2012/0163658 A1* | 6/2012 | Pakulski | G06T 7/2053 |
| | | | 382/103 |
| 2012/0257053 A1* | 10/2012 | Gupta | H04N 7/181 |
| | | | 348/143 |
| 2012/0288153 A1* | 11/2012 | Tojo | G06T 7/0081 |
| | | | 382/103 |
| 2013/0002865 A1* | 1/2013 | Pakulski | G06K 9/3241 |
| | | | 348/143 |
| 2013/0162867 A1* | 6/2013 | Gupta | H04N 5/2621 |
| | | | 348/239 |
| 2013/0251260 A1* | 9/2013 | Aerts | G06T 7/0081 |
| | | | 382/173 |
| 2013/0271601 A1* | 10/2013 | Rodriguez Gonzalez | H04N 7/18 |
| | | | 348/143 |
| 2014/0247362 A1* | 9/2014 | Li | G06K 9/00771 |
| | | | 348/159 |
| 2015/0054824 A1* | 2/2015 | Jiang | G06K 9/6284 |
| | | | 345/420 |
| 2015/0334398 A1* | 11/2015 | Socek | G06T 7/11 |
| | | | 375/240.26 |
| 2017/0344832 A1* | 11/2017 | Leung | G06K 9/00771 |

* cited by examiner

Pixels

Image

Empty pixels represent grid points

Example superpixel segmentation

VIDEO SEGMENTATION METHOD

REFERENCE TO RELATED PATENT APPLICATION(S)

This application claims the benefit under 35 U.S.C. § 119 of the filing date of Australian Patent Application No. 2014280948, filed 24 Dec. 2014, hereby incorporated by reference in its entirety as if fully set forth herein.

TECHNICAL FIELD

The present disclosure relates to object detection in a video and, in particular, to a method, apparatus and system for segmenting an image. The present disclosure also relates to a computer program product including a computer readable medium having recorded thereon a computer program for foreground segmentation of an image.

BACKGROUND

A video is a sequence of images. The images may also be referred to as frames. The terms 'frame' and 'image' are used interchangeably throughout this specification to describe a single image in an image sequence, or a single frame of a video. An image is made up of pixels where each pixel is represented by one or more values representing the visual properties at that pixel. For example, in one scenario three (3) values are used to represent the visual properties of a pixel, namely Red, Green and Blue colour intensity of each pixel.

The terms foreground objects and foreground refer to transient objects that appear in a scene captured on video. Such transient objects may include, for example, moving humans. The remaining part of the scene is considered to be background, even where the remaining part includes minor movement, such as water ripples or grass moving in the wind.

Scene modelling, also known as background modelling, involves modelling the visual content of a scene, based on an image sequence depicting the scene. One use of scene modelling is foreground segmentation by means of background subtraction. Foreground segmentation is also known as foreground/background separation. Foreground segmentation may also be described by its inverse (i.e., background segmentation). Examples of foreground segmentation applications include activity detection, unusual object or behaviour detection, and scene analysis.

Foreground segmentation allows a video analysis system to distinguish between transient foreground objects and the non-transient background through scene modelling of the non-transient background, and a differencing operation between that background and incoming frames of video. Foreground segmentation can be performed by using scene modelling and identifying portions of the modelled scene which are either moving, or recently changed/added, or both.

In one scene modelling method, the content of an image is divided into one or more visual elements, and a model of the appearance of each visual element is determined. Examples of possible visual elements include a pixel, or an 8×8 DCT block. Another representation of a visual element is a superpixel visual element. A scene model may maintain a number of models for each visual element location, with each of the maintained models representing different modes of appearance at each location within the scene model. The models maintained by a scene model are known as mode models, and mode models that correspond to background visual elements are known as background modes. For example, there might be one mode model for a visual element in a scene with a light being on, and a second mode model for the same visual element at the same location in the scene with the light off.

The visual elements in an input image are matched with mode models of the scene model. A "match mode" is identified for each visual element as the output of scene model matching, e.g. the mode having the best match to the input visual element. A visual element is classified as foreground or background depending on the age temporal characteristic of the match mode. The "Age" of a mode refers to duration since the time the mode was created. In one method, age is represented in terms of number of frames passed since mode is created. The age of the match mode is compared to a pre-defined age threshold to classify a visual element as foreground or background.

Scene Modelling Techniques are Adaptive

Generally, the background in a video scene is always changing. An example is an outdoor scene where the scene changes as time passes from morning to night, and changes as time passes from night to morning again. Many scene modelling techniques are adaptive and update the scene model to learn changes in background. In one approach a learning rate is used to learn changes in the scene. Another approach uses an age based approach. A visual element is classified as background if the matched mode has an age that is greater than a predefined threshold. In general, a change in the scene (ie a region of the scene which changes) will be learned and the change will be classified as being background if the change remains static for a pre-defined minimum amount of time.

A particular challenge to adaptive scene modelling is how to handle the background merging/revealed background situation. The background merging situation refers to scenarios in which a foreground object is merged into the background due to being static for an extended amount of time. An example of a background merging situation is a bus stop scenario. In this example a bus comes to the stop and remains static at the stop for some time. If the bus stays static for a time period greater than an age threshold, then the scene model will be updated to learn and conclude that the bus is a background object. This process of learning and classifying the bus as background may result in a subsequent missed detection of the bus, when the bus comes back to the stop in the future.

The revealed background situation refers to a scenario in which a part of the background scene was initially occluded by an object. Later, however, the object has moved, thereby revealing background which was previously occluded. Existing adaptive scene modelling techniques will detect the revealed area initially as being foreground and will require some time to learn and classify the revealed area as being background. The time required depends on the value of the age threshold parameter.

An existing approach to deal with background merging and the revealed background situation is via adapting the learning rate of the scene model depending on the colour gradient) of the input frame and the background image along the contour of a foreground blob. Foreground blobs are generated by performing a connected component analysis of foreground visual elements. A complete group of connected foreground visual elements is referred to as a blob. However, such techniques do not operate well in scenarios where multiple background modes exist. Another challenge is robustness of the existing techniques to spurious detection in some frames due to per-frame dependency of the learning rate on blob characteristics which may result in spikes in the scene model learning rate.

Thus, a need exists to provide an improved approach for scene modelling, that is both robust to background merging/revealed background situation and that is also relatively computationally inexpensive.

SUMMARY

It is an object of the present invention to substantially overcome, or at least ameliorate, one or more disadvantages of existing arrangements.

Disclosed are arrangements, referred to as Time Dependent Foreground/Background (TDFB) arrangements, which seek to address the above problems by classifying a visual element as foreground or background dependent upon motion and continuity strength values accumulated over time.

According to a first aspect of the present invention, there is provided a method for classifying a visual element in a video frame as either foreground or background, the video frame being characterised using a scene model comprising a plurality of modes, the method comprising the steps of:

determining a blob boundary characteristic for a blob comprising at least the visual element;
identifying a mode matched to the visual element;
classifying the visual element and the matched mode as foreground dependent upon a match mode boundary characteristic of the matched mode; and
updating the scene model dependent upon the blob boundary characteristic and the matched mode boundary characteristic.

According to another aspect of the present invention, there is provided an apparatus for implementing any one of the aforementioned methods.

According to another aspect of the present invention, there is provided a computer program product including a computer readable medium having recorded thereon a computer program for implementing any one of the methods described above.

Other aspects of the invention are also disclosed.

BRIEF DESCRIPTION OF THE DRAWINGS

At least one embodiment of the invention will now be described with reference to the following drawings, in which.

DETAILED DESCRIPTION INCLUDING BEST MODE

Glossary

Figure 1:
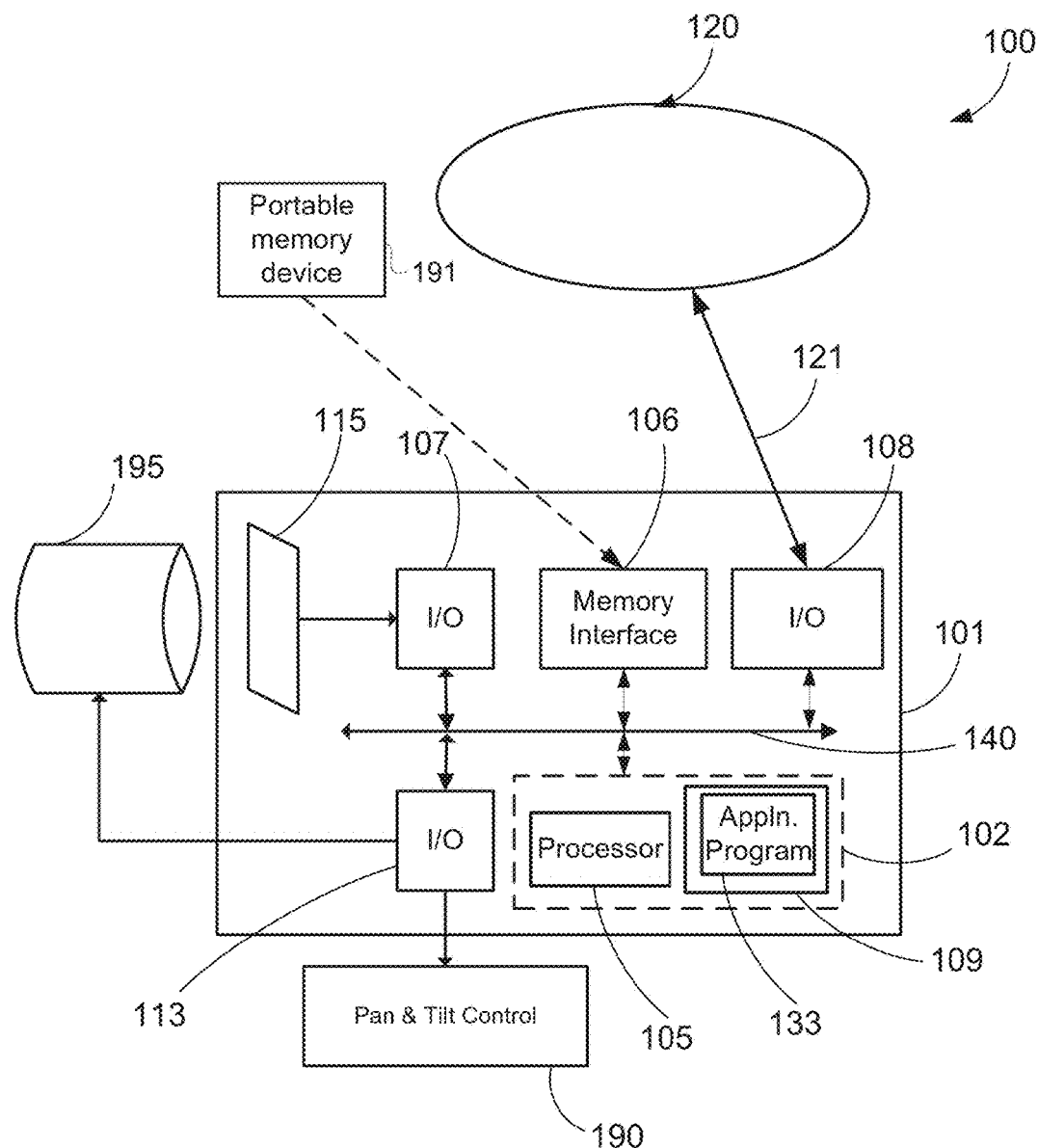
FIGS. 1 and 2 are a schematic block diagram of a camera, upon which TDFB methods described below can be practiced.

The following terms and symbols are used in this specification:

a a predetermined parameter used in Equation 2 the logistic function which converts age to background probability of a mode $age_{th}$ a threshold which is used to compare age of a mode to decide foreground probability $age_{thmax}$ a predetermined threshold which is used to determine the value of $age_{th}$ b a predetermined parameter used in Equation 2 the logistic function which converts age to background probability of a mode $b_{bc}$ foreground blob boundary characteristic $boundary_{offset}$ a parameter used with $m_{age}$ to classify a mode as foreground or background; this is a parameter which takes into account continuity strength values accumulated over time for the calculation of P(m==BG)

c/d a pre-defined constant which represents a multiplying factor to determine $age_{th}$ mainly in the start of a video Cf a time at which a model was created $C_I$ the coefficient of the corresponding input element in the input frame cs continuity strength is a foreground blob boundary characteristic which indicates strength of a boundary gradient (i.e. how continuous a connection is) between two neighbouring visual elements across a boundary element $cs_{max}$ is a pre-determined parameter used to control the relative importance of $boundary_{offset}$ $cs_{min}$ is a pre-determined parameter used to control the relative importance of $boundary_{offset}$ $cs_{th}$ a predetermined threshold which is compared to $m_{bc}$ $C_{th}$ a pre-determined threshold which is used to compare with a mode's boundary characteristic to decide boundary offset parameter $C_v^t$ the coefficient value at time t for mode v $C_v^{t+1}$ the updated mode coefficient value which will be used for scene matching in the next frame (at time t+1)

Df the frame number at which a mode is marked for deletion f the approximated median updating function $I \cdot \vec{V}_k$ the visual feature vector for the $k^{th}$ visual element of the input frame I;

l the logistic function used in Equation 2

Lmf a time at which the model was last matched with an input visual element in an input image $LR_{max}$ controls the maximum change in the coefficient value per update $m_{age}$ the age of a matched mode match score a measure of the match between the visual descriptor of the selected mode and the corresponding visual feature $m_{bc}$ a boundary characteristic of a mode (contain information regarding foreground blobs of which the superpixel associated with the mode has been part)

$m'_{bc}$ updated mode boundary characteristic

Mc the number of times the model has been matched with an input visual element in an input image n the number of element model sets in the scene model.

$n_f$ the index of the frame presently being considered

P(m==BG) probability of an input visual element being classified as foreground having matched mode m.

$S^2$ the approximate area of a superpixel;

sensitivity level predetermined threshold used to determine if the match score is good enough sensitivity pre-determined threshold used to assess the probability P(m==BG)

$v_k^b$ the $k^{th}$ boundary visual element of the foreground blob made up of a total of K visual elements $VE_k$ represents $k^{th}$ superpixel visual element consisting of P pixels $V_j^{input,k}$ represents a $j^{th}$ visual feature of a superpixel visual element (eg the mean of colour values of all pixels belonging to a superpixel visual element)

$vs_p$ represents visual similarity between two boundary neighbours of a boundary visual element α a pre-determined learning rate for mode boundary characteristic Context Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of documents or devices which form public knowledge through their respective publication and/or use. Such should not be interpreted as a representation by the present inventor(s) or the patent applicant that such documents or devices in any way form part of the common general knowledge in the art.

A video is a sequence of images or frames. Thus, each frame is an image in an image sequence (video sequence). Each frame of the video has an x axis and a y axis. A scene is the information contained in a frame and may include, for example, foreground objects, background objects, or a combination thereof. A scene model is stored information characterising a frame and/or a scene and may include model information about the foreground, model information about the background, or model information about the a combination thereof. A scene model generally relates to background information derived to from an image sequence.

A video may be encoded and compressed. Such encoding and compression may be performed intra frame, such as in motion-JPEG (M JPEG), or inter-frame, such as specified in the H.264 standard. An image is made up of visual elements. The visual elements may be, for example, pixels, or 8×8 DCT (Discrete Cosine Transform) blocks as used in JPEG images in a motion-JPEG stream, or wavelet domain transformed images as used in JPEG2000 images in a motion-JPEG2000 stream, or may be superpixels. A visual element position in the frame is represented by x and y coordinates of the visual element under consideration.

One representation of a visual element is a pixel visual element. In one arrangement, each visual element has three (3) values describing the visual element. In one example, the three values are Red, Green and Blue colour values (RGB values). The values representing characteristics of the visual element are referred to as visual element attributes. The number and type of values associated with each visual element (referred to as visual element attributes) depend on the format utilised for the apparatus configured to implement the TDBF arrangement. It is to be noted that values stored in other colour spaces, such as the four-valued Cyan, Magenta, Yellow, and Key black (CMYK), or values representing Hue-Saturation-Lightness, may equally be utilised, depending on the particular implementation, without departing from the spirit and scope of the present disclosure.

Another representation of a visual element is an 8×8 DCT block visual element. The visual element attributes for an 8×8 DCT block are 64 luminance DCT coefficients, 64 chrominance red (Cr) DCT coefficients, and 64 chrominance blue (Cb) DCT coefficients of the block. The 64 luminance DCT coefficients can be further divided into 1 DC coefficient, and 63 AC coefficients. The DC coefficient is a representation of average luminance value of the visual element and the AC coefficients represent the frequency domain information of the luminance characteristics of the 8×8 block. The AC coefficients are commonly ordered from lowest-frequency to highest frequency components, organised in a zig-zag fashion. AC1 represents the DCT component with the lowest horizontal frequency. AC2 represents the horizontal component with the lowest vertical frequency, and so on. The higher-numbered AC coefficients correspond to higher frequencies. The attributes are represented as (Y, U, V, AC), representing the DC coefficient (Y), the chrominance values (U, V) and the AC coefficients (AC), giving 196 attributes in total. Many other combinations of attributes are possible or other attributes can be generated from the above mentioned attributes using machine learning algorithms, such as linear regression techniques.

A region is defined as one or more spatially connected visual elements, for which characteristics such as texture, average colour, or average brightness may be derived from pixel image data of the corresponding image/video frame. A region may be the entire image, or a subset of the image. There is no limitation placed on the content of the region. A region may thus contain only background, or a region may contain only foreground, or a region may contain a mixture of background and foreground. A region may be user defined. For example, scene modelling may only occur in a region of the scene defined by the user.

Another representation of a visual element is a superpixel visual element. A superpixel can be defined as a set of pixels that generally have common properties, such as location and colour. Superpixels can be grown from seeds, where every pixel in the image is assigned to a seed based on a cost function. The cost function may include one or more attributes, such as a difference in intensity (e.g., colour and/or brightness) between the pixel and the seed, a distance of the pixel from the seed, and a minimum gradient cost from the seed to the pixel. The attributes for a superpixel may include average colour and/or brightness, size, orientation, standard deviation or variance of colour and/or brightness, or texture (e.g. such features as Local Binary Pattern (LBP)). In some applications, a superpixel may be considered to be a region with additional constraints, such as homogeneity of attributes and distance from the seed.

In an example of a TDBF arrangement, a visual element is a superpixel. The colour model is typically YCbCr, where the Y component represents luminance, and the Cb and Cr represent chrominance. In other TDBF arrangements, a visual element is a pixel. In another TDBF arrangement, a visual element is an 8×8 DCT block.

It is to be noted that the described TDBF methods may equally be practised using other representations of visual elements.

Figure 2:
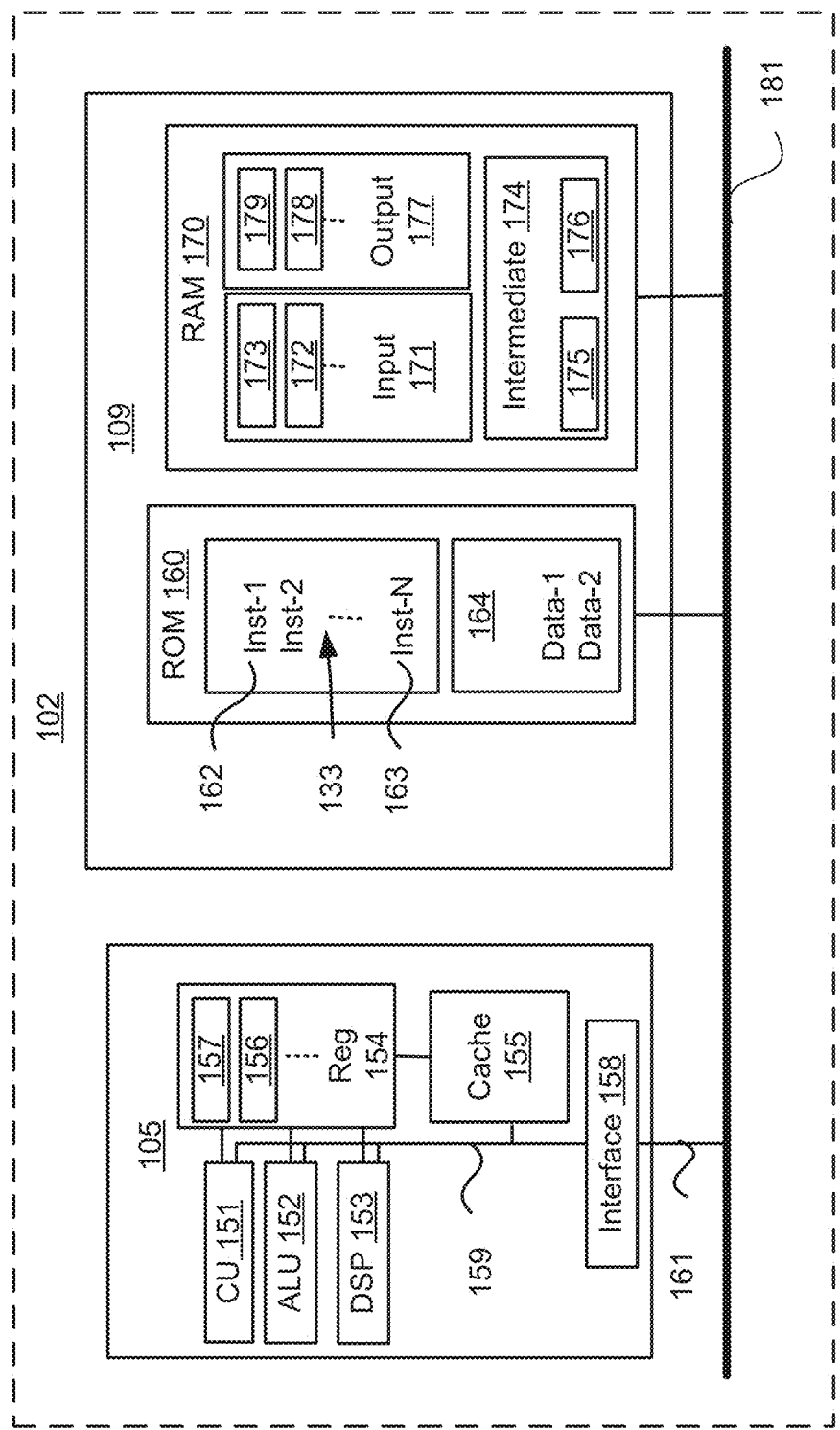

FIGS. 1 and 2 are a schematic block diagram of a camera 100, upon which described methods may be practiced. The camera 100 is a pan-tilt-zoom camera (PTZ), for example of a type often used for video surveillance operations, either as a stand-alone camera, or as part of a network of cameras configured to survey an area with or without overlapping fields of view. The camera 100 comprises a camera module 101, a pan and tilt module 190, and a lens system 195.

As seen in FIG. 1, the camera module 101 comprises an embedded controller 102. In the present example, the embedded controller 102 includes at least one processor unit 105 (or processor) which is bi-directionally coupled to an internal storage module 109. The storage module 109 may be formed from non-volatile semiconductor read only memory (ROM) 160 and semiconductor random access memory (RAM) 170, as seen in FIG. 2. The RAM 170 may be volatile, non-volatile or a combination of volatile and non-volatile memory.

As seen in FIG. 1, the camera module 101 also comprises a portable memory interface 106 which is coupled to the processor 105. The portable memory interface 106 allows a complementary portable memory device 191 to be coupled to the camera module 101 to act as a source or destination of data or to supplement the internal storage module 109. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The camera module 101 also comprises an input/output (I/O) interface 107 that couples to a photo-sensitive sensor array 115.

The camera module 101 also comprises a communications I/O interface 108 that couples to a communications network 120 via a connection 121. The connection 121 may be wired or wireless. For example, the connection 121 may be radio frequency or optical. An example of a wired connection includes Ethernet. Further, an example of wireless connection includes Bluetooth™type local interconnection, Wi-Fi (including protocols based on the standards of the IEEE 802.11 family), Infrared Data Association (IrDa) and the like.

The camera module 101 also comprises an I/O interface 113 for the pan and tilt module 190 and the lens system 195.

The components, which include the sensor I/O interface 107, embedded controller 102, communications I/O interface 108, control interface 113 and memory interface 106 of the camera module 101, typically communicate via an interconnected bus 140 and in a manner which results in a conventional mode of operation known to those in the relevant art.

The described TDFB methods may be implemented using the embedded controller 102, where the processes of FIGS. 3 and 7 to 10 may be implemented as one or more TDFB software application programs 133 executable within the embedded controller 102.

The camera module 101 of FIG. 1 implements the described TDFB methods. In particular, with reference to FIG. 2, the steps of the described methods are effected by instructions in the software 133 that are carried out within the controller 102. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 133 of the embedded controller 102 is typically stored in the non-volatile ROM 160 of the internal storage module 109. The software 133 stored in the ROM 160 can be updated when required from a computer readable medium such as 191. The software 133 can be loaded into and executed by the processor 105. In some instances, the processor 105 may execute software instructions that are located in RAM 170. Software instructions may be loaded into the RAM 170 by the processor 105 initiating a copy of one or more code modules from ROM 160 into RAM 170. Alternatively, the software instructions of one or more code modules may be pre-installed in a non-volatile region of RAM 170 by a manufacturer. After one or more code modules have been located in RAM 170, the processor 105 may execute software instructions of the one or more code modules.

The application program 133 is typically pre-installed and stored in the ROM 160 by a manufacturer, prior to distribution of the camera module 101. However, in some instances, the application programs 133 may be supplied to the user encoded on one or more CD-ROM or other media (such as 191) and read via the portable memory interface 106 of FIG. 1 prior to storage in the internal storage module 109 or in the portable memory as described above. In another alternative, the software application program 133 may be read by the processor 105 from the network 120, or loaded into the controller 102 or such portable storage medium from other computer readable media. Computer readable storage media refers to any non-transitory tangible storage medium that participates in providing instructions and/or data to the controller 102 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the camera module 101. Examples of transitory or non-tangible computer readable transmission media that may also participate in the provision of software, application programs, instructions and/or data to the camera module 101 include radio or infra-red transmission channels as well as a network connection to another computer or networked device, and the Internet or Intranets including e-mail transmissions and information recorded on Websites and the like. A computer readable storage medium having such software or computer program recorded on it is a computer program product.

FIG. 2 illustrates in detail the embedded controller 102 having the processor 105 for executing the application programs 133 and the internal storage 109. The internal storage 109 comprises read only memory (ROM) 160 and random access memory (RAM) 170. The processor 105 is able to execute the application programs 133 stored in one or both of the connected memories 160 and 170. When the camera module 101 is initially powered up, a system program resident in the ROM 160 is executed. The application program 133 permanently stored in the ROM 160 is sometimes referred to as "firmware". Execution of the firmware by the processor 105 may fulfil various functions, including processor management, memory management, device management, storage management and user interface.

The processor 105 typically includes a number of functional modules including a control unit (CU) 151, an arithmetic logic unit (ALU) 152, a digital signal processing (DSP) unit 153 and a local or internal memory comprising a set of registers 154 which typically contain atomic data elements 156, 157, along with internal buffer or cache memory 155. One or more internal buses 159 interconnect these functional modules. The processor 105 typically also has one or more interfaces 158 for communicating with external devices via system bus 181, using a connection 161.

The application program 133 includes a sequence of instructions 162 through 163 that may include conditional branch and loop instructions. The program 133 may also include data, which is used in execution of the program 133. This data may be stored as part of the instruction or in a separate location 164 within the ROM 160 or RAM 170.

In general, the processor 105 is given a set of instructions, which are executed therein. This set of instructions may be organised into blocks, which perform specific tasks or handle specific events that occur in the camera module 101. Typically, the application program 133 waits for events and subsequently executes the block of code associated with that event. Events may be triggered in response to input from the interfaces 107, 108 and 113 of the camera module 101.

The execution of a set of the instructions may require numeric variables to be read and modified. Such numeric variables are stored in the RAM 170. The described methods use input variables 171 that are stored in known locations 172, 173 in the memory 170. The input variables 171 are processed to produce output variables 177 that are stored in known locations 178, 179 in the memory 170. Intermediate variables 174 may be stored in additional memory locations in locations 175, 176 of the memory 170. Alternatively, some intermediate variables may only exist in the registers 154 of the processor 105.

The execution of a sequence of instructions is achieved in the processor 105 by repeated application of a fetch-execute cycle. The control unit 151 of the processor 105 maintains a register called the program counter, which contains the address in ROM 160 or RAM 170 of the next instruction to be executed. At the start of the fetch execute cycle, the contents of the memory address indexed by the program counter is loaded into the control unit 151. The instruction thus loaded controls the subsequent operation of the processor 105, causing for example, data to be loaded from ROM memory 160 into processor registers 154, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 133, and is performed by repeated execution of a fetch-execute cycle in the processor 105 or similar programmatic operation of other independent processor blocks in the camera module 101. The camera 100 may be used to capture input images representing the visual content of a scene appearing in the field of view of the camera 100. The visual content may include one or more foreground objects and one or more background objects.

Implementation

Figure 3:
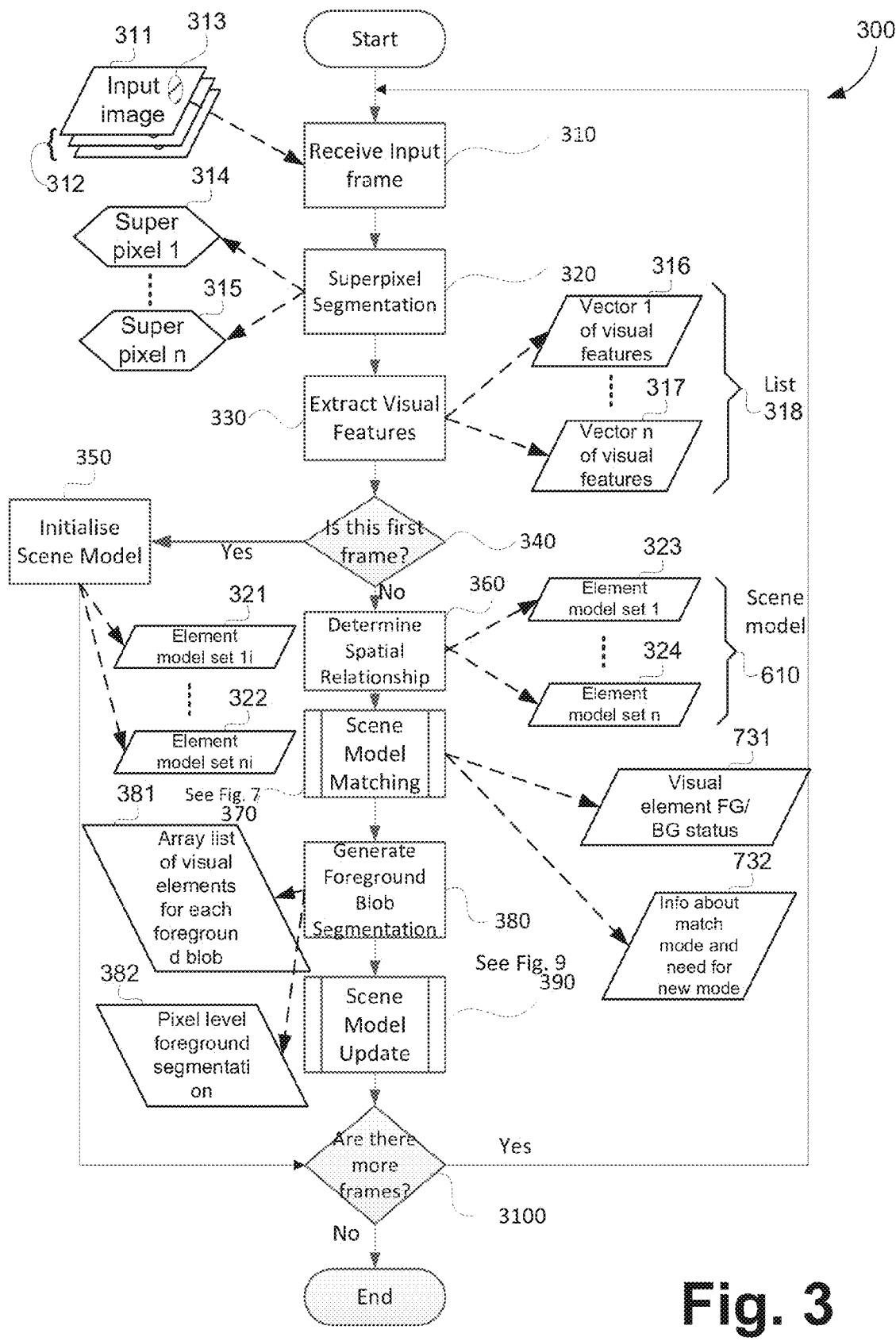
FIG. 3 is a schematic flow diagram illustrating a method of foreground segmentation.

FIG. 3 is a schematic flow diagram showing a method 300 of foreground segmentation. The method 300 may be implemented as one or more code modules of the software application program 133 resident in the storage module 109 of the camera 100 and controlled in its execution by the processor 105. The method 300 may be used for video segmentation to identify areas of foreground in a scene for a given image from a sequence of images.

The present TDBF disclosure provides a scene modelling method which uses foreground blob boundary characteristic to update mode boundary characteristics and subsequently can be used for foreground segmentation.

The foreground segmentation method 300 uses superpixels as the visual element. Superpixels are dynamic visual elements for foreground segmentation. Superpixels are dynamic as their size and shape may change from frame to frame. That is, the size and shape of a superpixel is not pre-determined (as it is for the case of the visual element being a pixel or an 8×8 DCT block). The size and shape of a superpixel may change from frame to frame depending on the content of the input image.

The method 300 begins at a receiving step 310, performed by the processor 105 executing the TDBF software program 133, which receives an input image 311 from a sequence 312 of images captured by the camera 100. The image 311 may be retrieved at the step 310 from the storage module 109. For example, the accessed image 311 may have been captured by the camera 100 and stored within the RAM 170 of the storage module 109 prior to execution of the method 300.

Superpixel Segmentation [320]

At a subsequent segmenting step 320, performed by the processor 105 executing the TDBF software program 133, the method 300 segments the input image into a number of superpixels, such as 314, . . . , 315, using a set of seeds. The superpixel segmentation of an image is a type of image over-segmentation where salient features of a pixel-based representation 313, such as pixels sharing a similar colour and location, are grouped in one segment. In one TDBF arrangement, the seeds for the superpixel segmentation step 320 are predetermined. In another TDBF arrangement, the seeds are determined using the given image. In an example of a TDBF arrangement, the seeds are selected according to a gridded pattern overlaid over the given image.

In one TDBF arrangement, the Simple Linear Iterative Clustering (SLIC) superpixel segmentation method is used. SLIC clusters pixels based on their colour similarity and their spatial distance from a seed, usually in the LAB colour space. A typical feature vector for SLIC segmentation would be [l,a,b,x,y]. When clustering, each pixel is only compared to a seed within a search area, which is generally a 2S×2S area, where $S^2$ is the approximate area of a superpixel. S is also used to normalise relative weights applied to the Euclidean distance of the colour similarity (ie the colour distance) and the Euclidean distance of the spatial distance.

Accordingly, according to this TDBF arrangement, the step 320 clusters pixels based upon the visual and spatial features of the pixels. After a first clustering, the seed feature vector can be changed to the average feature vector for the cluster. The clustering process can then be repeated iteratively, followed by an averaging of the feature vector for each cluster to create the next set of seeds for the following iteration.

In another TDBF arrangement, the Geodesic superpixel segmentation method is used. Geodesic superpixel segmentation creates eight (8) gradient values for each pixel, based on corresponding colour dis-similarity between a pixel and each of the 8-way neighbours. Pixels are then assigned to a seed by finding the seed with the minimum cost path to each pixel.

Other superpixel segmentation methods may alternatively be used.

Feature Extraction [330]

After the step 320, the method 300 progresses to a step 330, performed by the processor 105 executing the TDBF software program 133. The step 330 extracts sets 316, ..., 317 of visual features (represented as $I \cdot \vec{V}_k$) for corresponding dynamic visual elements 314, ..., 315 (henceforth referred to as superpixel visual elements). In one TDBF arrangement, the sets 316, ..., 317 are represented by feature vectors. In one TDBF arrangement, the mean of colour values of all pixels belonging to a superpixel visual element is used as a visual feature vector. In one TDBF arrangement, the input frame 311 is in Red, Green, Blue (RGB) colour format, i.e. there are 3 values representing red, green and blue colour values for each pixel. In this TDBF arrangement, the YCbCr colour domain may be used as the basis for feature representation by the step 330. In that event, the image is converted from RGB to YCbCr color domain using the following colour conversion equations:

$$\begin{bmatrix} Y \\ Cb \\ Cr \end{bmatrix} = \begin{bmatrix} 0.299 & 0.587 & 0.114 \\ -0.1687 & -0.3313 & 0.5 \\ 0.5 & -0.4187 & -0.0813 \end{bmatrix} + \begin{bmatrix} 0 \\ 128 \\ 128 \end{bmatrix}$$

The above expression is used for 8 bit R, G and B values. To represent visual characteristics of the visual element 314 (i.e. the colour distribution of pixels in the visual element 314 e.g. R, G and B colour values), visual features are determined. Let $I \cdot \vec{V}_k$ represent the visual feature vector for the $k^{th}$ visual element of the input frame I. In one TDBF arrangement, the mean of colour values of all pixels belonging to a superpixel visual element is used as a visual feature vector, i.e.

$$I \cdot \vec{V}_k = \{V_1^{input,k}, V_2^{input,k}, V_3^{input,k}\}$$

where, $V_j^{input,k}$ j=1, 2, 3 represents a $j^{th}$ visual feature, and where:

$$V_1^{input,k} = \frac{1}{P} \sum_{p \in VE_k} Y_p$$

$$V_2^{input,k} = \frac{1}{P} \sum_{p \in VE_k} Cb_p$$

$$V_3^{input,k} = \frac{1}{P} \sum_{p \in VE_k} Cr_p$$

and, where, $VE_k$ represents $k^{th}$ superpixel visual element consisting of P pixels; $Y_p$, $Cb_p$, and $Cr_p$ represent Luma, Chroma blue and Chroma red colour values for the $p^{th}$ pixel. The above equation determine visual feature for a visual element by calculating mean colour values.

In another TDBF arrangement, in the step 330 apart from visual colour features, other attributes that are used to describe a superpixel visual element are also included in the sets 316, ..., 317 of visual features. Such attributes may include the standard deviation or variance of the luminance of the superpixel, features to describe the shape of the superpixel (for example, an ellipse approximation), and features to describe the texture (for example, an LBP histogram).

Figure 4A:
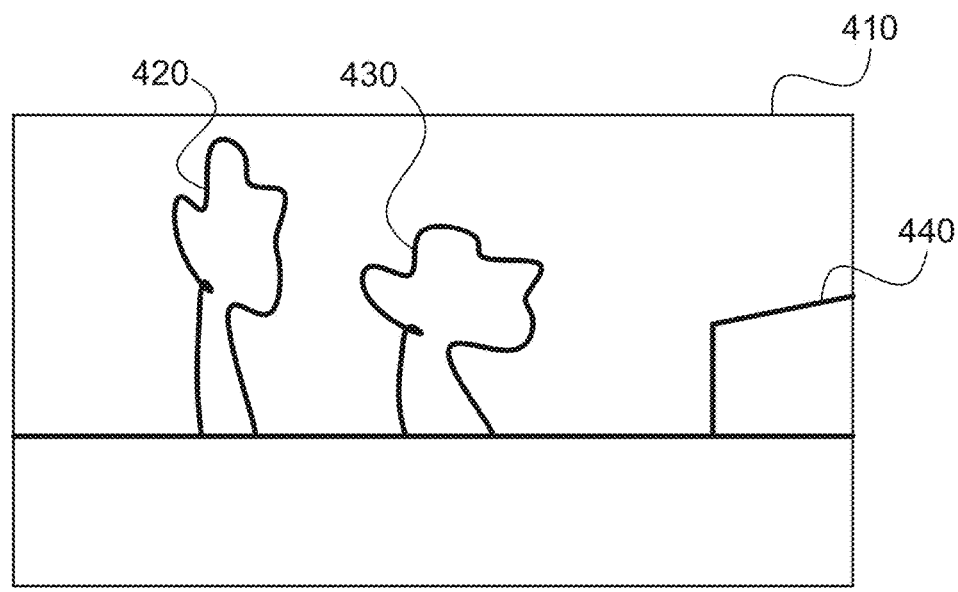
FIG. 4A shows an example of an input image.

FIG. 4A shows an example of an image 410 in a video sequence of a scene. The scene has three structures 420, 430, and 440. In the example of FIG. 4A the image 410 is received at the step 310 and subsequently the image 410 is processed by the segmenting step 320.

Figure 4B:
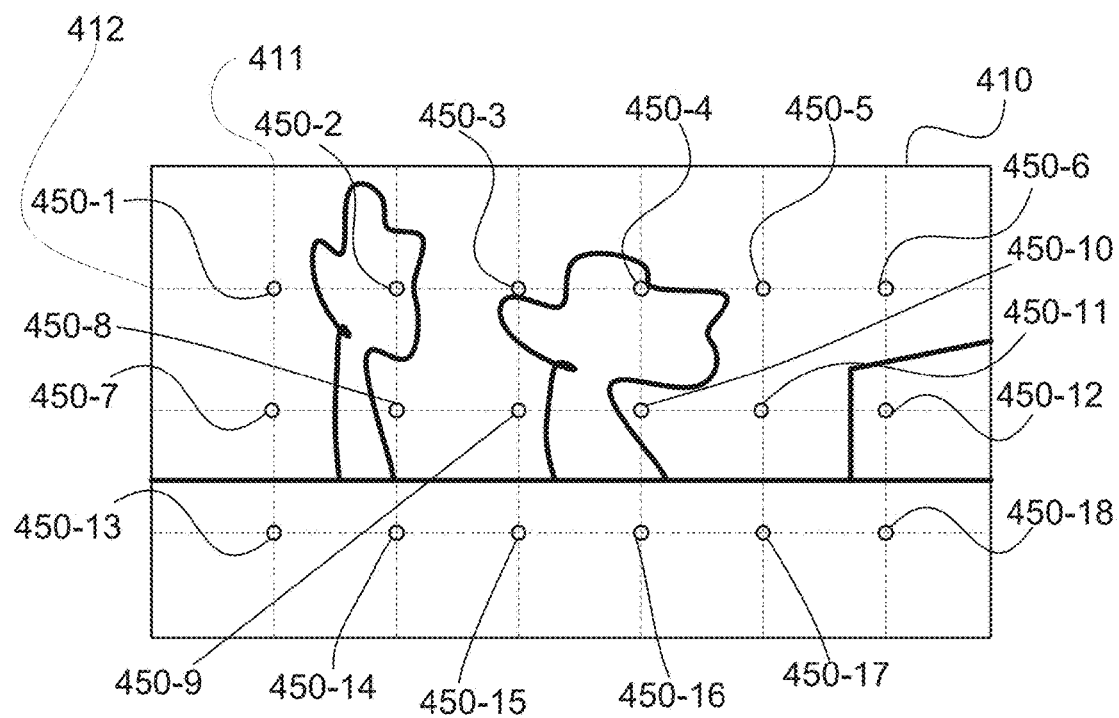
FIG. 4B shows an example of the location of a grid and grid based seed points 10 in the image of FIG. 4A.

FIG. 4B shows grid points, defined for example by intersections of grid lines such as 411, and 412, and grid based seed points to be used as seeds for the segmenting step 320 in the example image 410. In the example of FIG. 4B, there are a total of eighteen (18) seed points referred to by reference numerals 450-1 to 450-18 in raster scan (also known as row major) order. The seed point 450-1 is located at a grid point (hidden behind the seed point 450-1) established by the grid lines 411 and 412. The seed points 450-1 to 450-18 are the initial seed points to be used by the segmenting step 320. The segmenting step 320 may further perturb the seed points to move the seed points away from edges in the image, or may relocate the seed points over multiple iterations during segmentation. Subsequent frames may either use the same input seed points as this frame, or may use the relocated seed points from each corresponding previous frame.

Figure 4C:
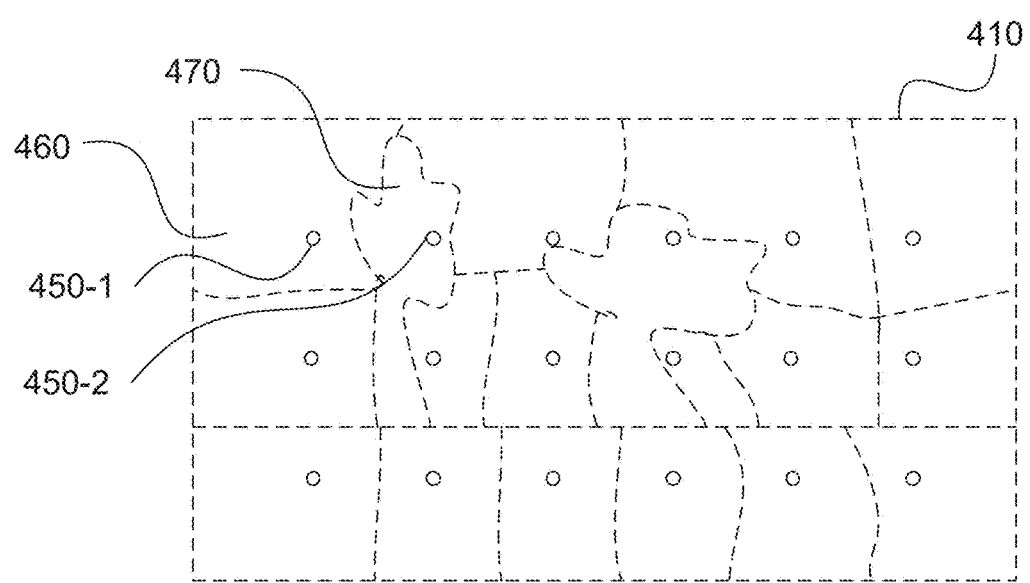
FIG. 4C shows an example of superpixel segmentation of the input image of FIG. 4A.

FIG. 4C shows a possible superpixel segmentation of the example image 410 that is output by the step 320. For example, a segment 460 represents a superpixel visual element corresponding to (ie formed using) the seed 450-1, a segment 470 represents a superpixel visual element corresponding to the seed 450-2, and so on. In this example the superpixel visual element 470 is seen to correspond with the structure 420 of FIG. 4A.

The output of the feature extraction module 330 is a list 318 of visual feature vectors 316, ..., 317 for all the superpixel visual elements 314, ..., 315 formed by the step 320. In one TDBF arrangement, the list 318 is arranged in row-major order arrangement of 2D gridded seed points. We explain the list arrangement using FIGS. 5A, 5B, 5C, and 5D which depict an example of grid based seed points.

Figure 5A:
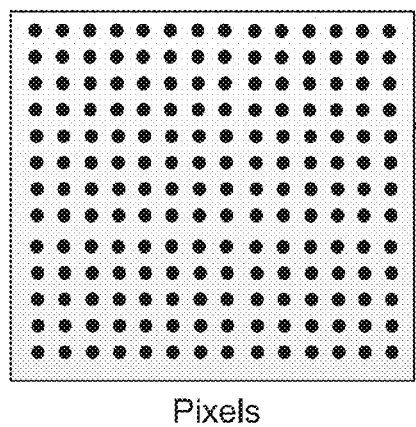
FIG. 5A shows an image with pixels depicted as filled circles.
Figure 5B:
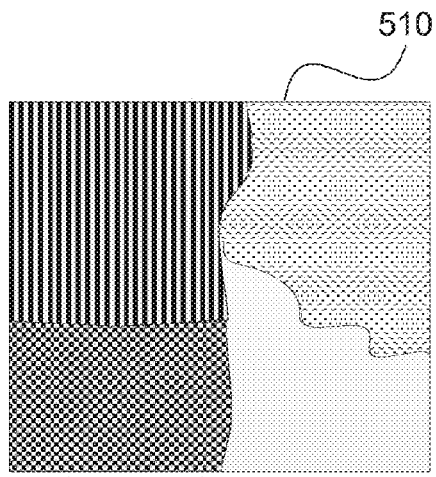
FIG. 5B shows an input image of FIG. 5A.
Figure 5C:
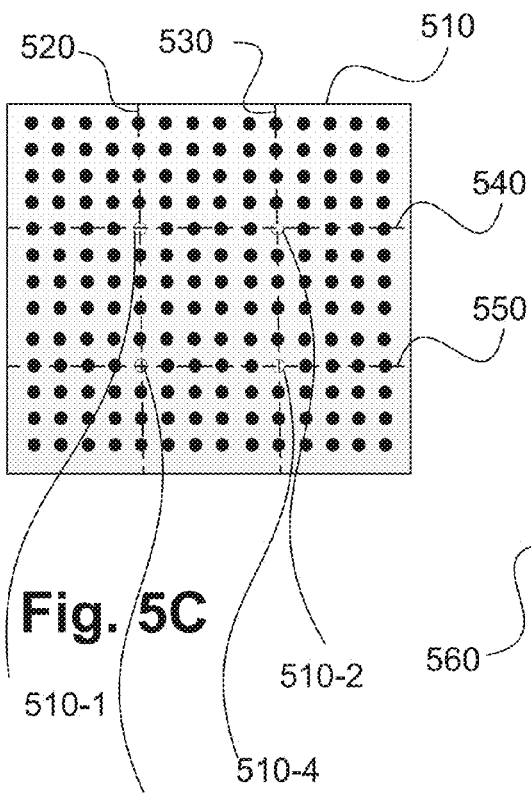
FIG. 5C shows four grid points in the image of FIG. 5A.
Figure 5D:
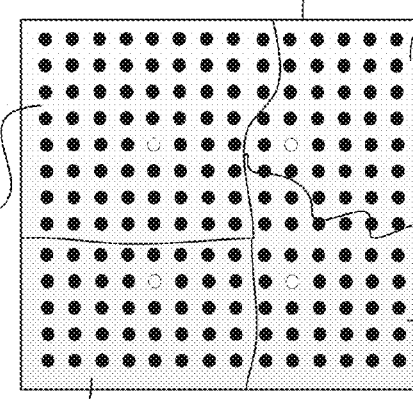
FIG. 5D shows a superpixel segmentation boundary of the image of FIG. 5A.

FIG. 5A depicts pixels in an input image 510 as black circles. FIG. 5B schematically shows an input image 510 where actual image values are applied to the pixels of FIG. 5A. FIG. 5C shows the input image 510 with four (4) grid points, with the grid points shown as white circles at the intersection of grid lines 520, 530, 540, and 550. A first grid point numbered as 510-1 is shown in FIG. 5C. The grid points of FIG. 5C may then be used as seed points for superpixel segmentation in the step 320 executed by the processor 105. FIG. 5D shows a possible superpixel segmentation of the image 510, where the image has been divided into four (4) superpixel visual elements 560, 570, 580, and 590. For the example shown in FIGS. 5A-5D, the visual feature list 318 has the superpixel visual element 560 as its first element, 570 as its second, 580 as its third and 590 as its fourth element.

After extracting the visual feature vectors 316, ..., 317 of the input frame 311 in the step 330 the process 300 proceeds to a decision step 340, performed by the processor 105 executing the TDBF software program 133. If the input frame 311 is the first frame of the sequence 312 that is processed, control follows a YES arrow and the process moves to a step 350, performed by the processor 105 executing the TDBF software program 133. If the input frame is not the first frame processed, then control follows a NO arrow and the process moves to a step 360, performed by the processor 105 executing the TDBF software program 133.

Scene Model Initialization [350]

If the input frame is the first frame to be processed, a scene model is initialised using the superpixel feature vectors 316, ..., 317 of the input frame 311 to form initialised element model sets 321, ..., 322. The scene model uses the superpixel visual elements 314, ..., 315 as building blocks to represent scene activity. In one TDBF arrangement, the number of element model sets 321, ..., 322 in the scene model 610 is initialised to be the same as the total number of superpixel visual elements 314, ..., 315 used to segment the input frame 311.

Figure 6:
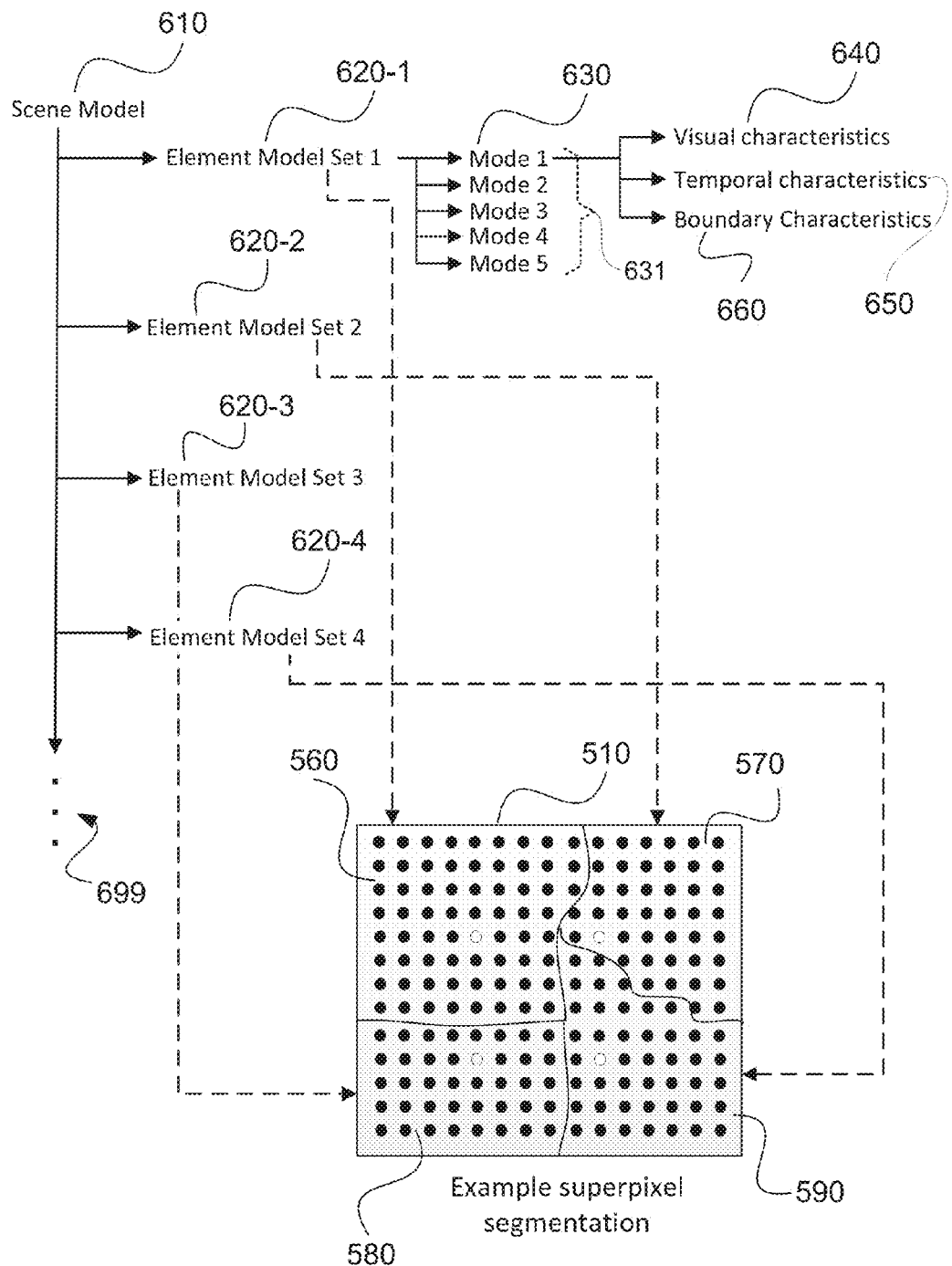
FIG. 6 shows an example of a scene model consisting of element model sets and modes for the example of FIGS. 5A to 5D.

FIG. 6 depicts a scene model 610 containing 4 element model sets 620-1, 620-2, 620-3, and 620-4. Each index 1, ..., n in the list 318 of visual features represents the corresponding superpixel visual element position 1, ..., n arranged in the same order as the list of the input frame's visual features such as 560, 570, 580 and 590. An element model set such as 620-1 contains a set 631 of one or more element models (also called mode model, or mode, for example shown by 630) each having an associated index identifying the mode id. The number of modes such as 630 in an element model set 620-1 depends on characteristics of the scene in question. Accordingly, in a scene with many activities and changing background, for example, more modes such as 630 are required for scene modelling. In one TDBF arrangement, a maximum of 5 modes is used for each element model set.

Mode Description

In one arrangement, a mode 630 from the set 631 of modes making up the Element model set 1 (ie 620-1) refers to an adaptive representation of a region such as 313, the adaptive representation containing visual, temporal and mode boundary characteristic information about the region surrounding a seed point associated with the list index. The mode 630 in one example thus comprises visual characteristics (also referred to as visual descriptors) 640, temporal characteristics (also referred to as temporal descriptors) 650, and boundary characteristics (also referred to as boundary descriptors) 660.

The temporal descriptors 650 contain temporal information related to the element model 630. In one exemplary arrangement, the temporal information 650 includes the following:

Cf frame number whenthe model was created [Units: a pure number eg "frame 135"], Lmf, Frame number whenthe model was last matched with an input visual element in an input image [Units: a pure number eg "frame 135"], Mc: the number of times the model has been matched with an input visual element in an input image [Units: a pure number, eg "6 times"], Df: the frame number at which this mode is marked for deletion [Units: a pure number eg "frame 135"]

Additionally, a mode also contains boundary characteristics ($m_{bc}$). The boundary characteristics $m_{bc}$ contains information regarding foreground blobs of which the mode has been a part. In one example TDBF arrangement, the mode's boundary characteristic $m_{bc}$ represents a metric determined from the continuity strength cs of the boundary of the foreground blob of which the mode has been a part.

In one TDBF arrangement, $m_{bc}$ has a value between 0 and 1 when the superpixel associated with the mode has been part of a foreground blob. A value of $m_{bc}=-1$ signifies that the superpixel associated with the mode has not been a part of a foreground blob yet. A value of $m_{bc}$ between 0 and 1 signifies that the superpixel associated with the mode has been part of foreground blob and the boundary characteristic of the mode has been initialised. A low value of $m_{bc}$ (~0) signifies that the foreground blob(s) of which the superpixel associated with the mode has been part, has low blob boundary characteristics. A high value of $m_{bc}$ (~1) signifies that the foreground blob(s) has high blob boundary characteristics. The parameter blob boundary characteristics is described later.

The scene model 610 is initialised by the step 350 using the visual features of the input frame 311. One mode (such as 630) for each superpixel visual element model set (such as 620-1) is defined using corresponding superpixel visual element visual features (such as 316). For example, the visual descriptor 640 of mode 1 (ie 630) of element model set 620-1 is defined according to the visual features 316 of superpixel visual element 560 (also see 314 in FIG. 3). The temporal features 650 are initially set in the step 350 as follows:

Cf=1

Lmf=1

Mc=1

The frame number Df for deletion of a mode is determined as a function of match counts Mc and last match frame Lmf. In one TDBF arrangement, the following expression is used to determine Df:

$$Df = Lmf + A*Mc + B \qquad \text{Equation 1}$$

Where, A and B are pre-defined constants. In one TDBF arrangement, A=16 and B=30 frames for video sequences captured at 10 frames per sec. Using the above expression, Df=47 frames is set during scene initialisation.

The temporal features 650 for all the other modes in the set 631 are initially set to zero in order to signal that the other modes are inactive. Inactive modes do not contain scene related information.

The boundary characteristic $m_{bc}$ (ie 660) of the mode is initialised to −1 which signifies that the superpixel associated with the mode has not yet been part of a foreground blob.

The other element models sets 2, 3, 4, ..., n are also initialised in the same manner. After finishing the scene model initialisation step 350, the process 300 moves to a step 3100.

At a given frame number in the sequence 312 of frames, one or more modes 630 are active. Later, as part of a step 390 (a scene model update step) scene model management is performed where all modes are active and a new mode needs to be created.

After finishing the scene model initialization step 350, all visual elements 314, ..., 315 are classified as background. The processing passes on to the step 3100, performed by the processor 105 executing the TDBF software program 133, which determines if there are more input frames 312 to process. If the result of this check is YES, processing passes to the processing step 310. If there are no more frames to process, control follows a NO arrow and the processing ends.

Determining Spatial Relationship [360]

Returning to the step 340, if the input frame 311 is not a first frame, control follows a NO arrow and processing continues with a step 360, performed by the processor 105 executing the TDBF software program 133. The processing step 360 determines a spatial relationship of each input superpixel visual element 560, 570, 580 and 590 (also see 314, . . . , 315) to the scene model 610. In an exemplary TDBF arrangement, the scene model 610 contains an element model set 620 (seen in FIG. 6) for each grid point (superpixel seed) 560 to 590. Each element model set 620-1, 620-2, . . . , has a direct relationship to a grid point 560, 570, . . . . Thus, a first superpixel visual element 560 corresponding to a first grid point 510-1 will always be associated to a first element model set 620-1. Similarly, second superpixel visual element 570 will always be associated to a second element model set 620-2, and so on. Accordingly, each element model set (such as 620-1) is allocated, in the present TDBF arrangement, to a superpixel visual element that is associated with a corresponding grid point (such as 450-1), where the term "grid point is used interchangeably with the term "superpixel seed", and this association of element model set and visual element is fixed for the duration of the method 300.

The output of the step 360 is an element model set 323, . . . , 324 corresponding to each input visual element 314, . . . 315, wherein the group of element model sets comprises a scene model 610 for the frame in question.

Scene Model Matching [370]

After finishing the processing step 360, the method 300 continues to a step 370, performed by the processor 105 executing the TDBF software program 133 which performs Scene Matching. The input to the step 370 is an element model set 233, . . . , 324 for each input visual element 314, . . . , 315. Each element model set such as 323 consists of multiple modes such as 630. The input modes such as 630 are compared to their corresponding input superpixel visual elements, described hereinafter in more detail with reference to FIG. 7.

Figure 7:
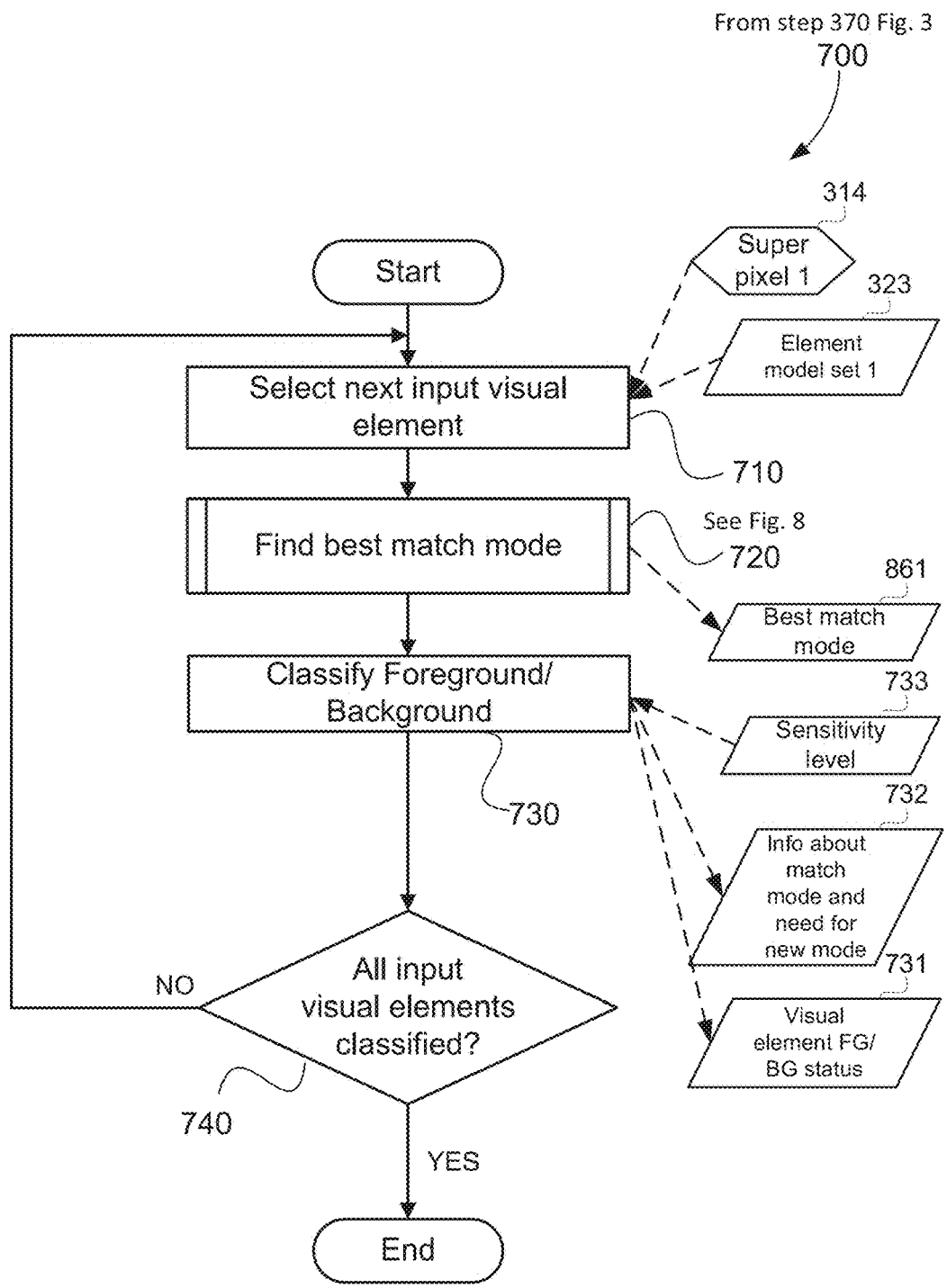
FIG. 7 is a schematic flow diagram illustrating a method of classifying all input superpixels in an input frame as either foreground or background.

FIG. 7 shows a sequential process 700 which processes each input visual element 314, . . . , 315. The method 700 starts with a step 710, performed by the processor 105 executing the TDBF software program 133, which selects the next input visual element such as 314 and the corresponding element model set such as 323. Processing then moves to a step 720, performed by the processor 105 executing the TDBF software program 133 and described hereinafter in more detail with reference to FIG. 8, which finds the best match mode from the element model set for the visual element 314 in question. A following step 730 classifies the input visual element 314 as foreground or background.

A preferred method 800 of initially classifying an input superpixel visual element as either foreground or background using the corresponding element model set (for example, 620-1), as executed in the step 720 by the processor 105, is described hereinafter in more detail with reference to FIG. 8.

Finding Best Match Mode [720]

Figure 8:
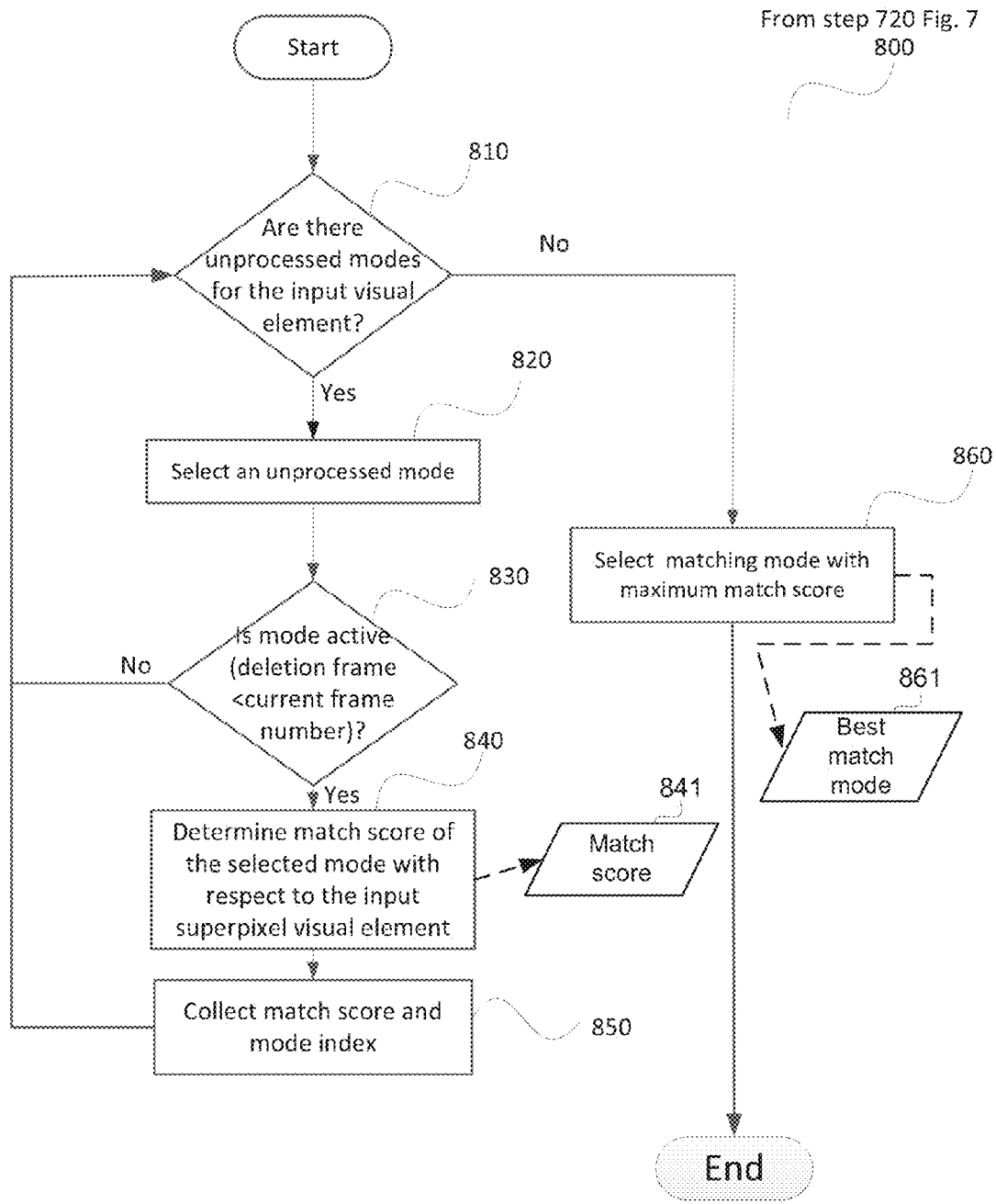
FIG. 8 is a schematic flow diagram illustrating a method of finding a best matched mode for an input visual element.
Figure 9:
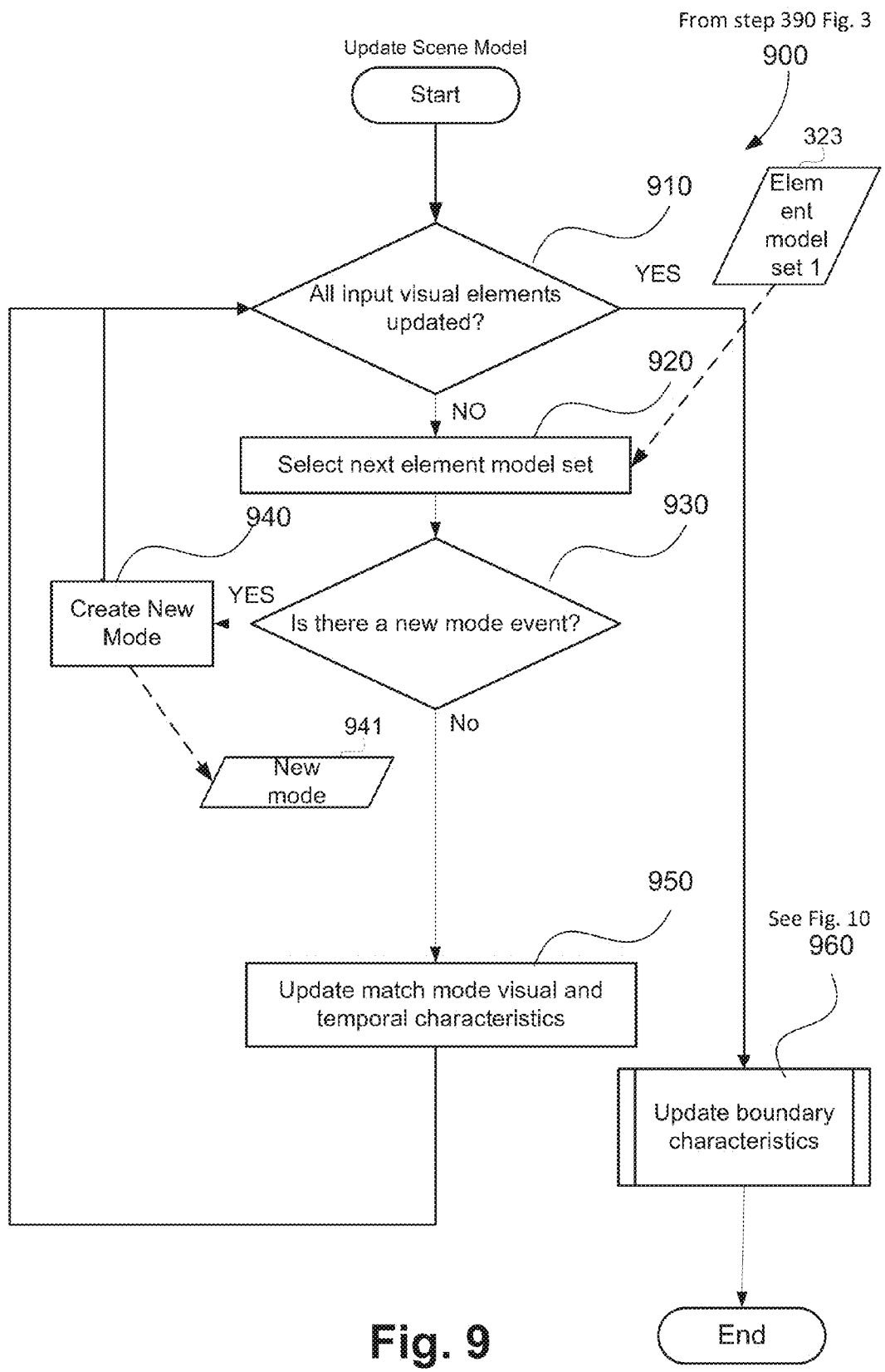
FIG. 9 is a schematic flow diagram illustrating a method of updating a scene model.

FIG. 8 shows a schematic flow diagram illustrating a method of determining the best matching mode that matches the input visual element 314. A first decision step 810, performed by the processor 105 executing the TDBF software program 133, determines if all the modes 631 of the element model set 620-1 have been compared to their corresponding input visual element 314. If all of the modes have been compared to the input visual element, then control follows a NO arrow and the flow continues to a "select best matching mode" step 860.

Returning to the decision step 810, if there are remaining modes to be compared, then control follows a YES arrow and the flow continues on to a next step 820, performed by the processor 105 executing the TDBF software program 133, which selects an unprocessed mode from 631. After selecting an unprocessed mode, a following step 830, performed by the processor 105 executing the TDBF software program 133, determines if the mode selected by the step 820 is active or not. A mode is active if its deletion frame number Df is greater than the frame number of the current frame being processed, or else the mode is not active.

If the mode is not active, flow follows a NO arrow and the process goes back to the step 810. If the mode is active, then control follows a YES arrow and the process continues to a step 840.

The step 840, performed by the processor 105 executing the TDBF software program 133, determines a match score 841 between the visual descriptor 640 of the mode selected by the step 820 and the corresponding visual feature 316 of the input superpixel visual element 314. A high match score signifies that the input visual element 314 and the mode are a match (ie the mode is a "matched mode") and that they probably belong to same physical entity in the scene. In one TDBF arrangement, the match score is estimated via probabilistic modelling of two class classifications, a match and a non-match class, using a comparison such as the absolute difference between the visual descriptors 640 of the selected mode and the visual features 318 of the input superpixel 314 in question. In this case, the match score lies between 0 and 1 where 0 represents no-match and 1 represents a perfect match. In one TDBF arrangement, the match class is modelled as a Gaussian model while the non-match is modelled as a uniform distribution. In another model, a probabilistic Support Vector Machine (SVM) classifier is used for match/non-match classification.

A next step 850, performed by the processor 105 executing the TDBF software program 133, collects the mode index and the corresponding matching score in an array to be used later in a step 860.

After the step 850, processing continues to the decision step 810. If there are no remaining unprocessed modes, then control follows a NO arrow to a step 860, performed by the processor 105 executing the TDBF software program 133, that selects from the array the mode with the best match score, thus determining the best matched mode among the input set 631 of modes for the input visual element 314 in question.

Returning to FIG. 7, after the step 720 determines the best match mode 861, the process 700 continues to a step 730, performed by the processor 105 executing the TDBF software program 133, which determines the foreground/background status of the input visual element 314 in question.

Determining Quality of Best Match Mode/New Mode Creation [730]

The step 730 first determines whether the best match mode 861 is a good enough match or not by comparing the match mode score with a pre-determined threshold value henceforth referred to as a sensitivity level 733. If the match score is lower than the sensitivity level, then a new mode creation event occurs and a new mode 941 (see FIG. 9) thus created is used for a scene model update in a step 390. If a new mode creation event occurs, the input visual element in question is classified as Foreground.

The sensitivity level defines how different an input visual element needs to be, compared to the existing modes in order to create a new mode. The sensitivity level may be chosen based on the machine learning from sample data. In one TDBF arrangement, the sensitivity level 733 is 0.5.

The sensitivity level 733 can be said to control how often new element modes such as 630 are created. A low sensitivity level will result in fewer new modes being created, and therefore more matches will be determined by the step 860 to existing element models. With a lower sensitivity level there will be more matches to background models as fewer foreground models will be created, and thus the output will contain fewer matched foreground models. A high sensitivity level will result in more new modes being created, and therefore fewer matches to existing modes will be determined by the step 860. As new modes are initially foreground models, with a high sensitivity level the output contains more matched foreground models and more newly created, foreground modes.

If the match score is higher than the sensitivity level 733, there will not be a new mode event. The input visual element classification is determined using the match mode's temporal and boundary characteristics as described hereinafter.
Determining Input Visual Element Status as Background or Foreground [730]

An input visual element such as 314 is classified by the step 730 as background or foreground depending on the characteristics of the matched mode 861 of the visual element in question. In one TDBF arrangement, temporal and boundary characteristics of a matched mode are used to generate the classification as follows:

Case 1: If Matched Mode Boundary Characteristic $m_{bc}=-1$

A value of $-1$ for $m_{bc}$ signifies that the matched mode has not been part of a foreground blob yet. In such scenario, the matched mode's temporal characteristics Cf, Lmf, Mc, and Df are used for foreground/background classification. In one TDBF arrangement, matched mode age is determined as follows:

$$m_{age} = n_f - Cf$$

where, $m_{age}$ is the age of the matched mode, $n_f$ represents current frame number of the input frame, $m_{age}$ refers to age of the mode (units: number of frames). The matched mode age $m_{age}$ is used to determine a probability of the input visual element being classified as Background. In one TDBF arrangement, the probability P is determined as follows:

$$P(m == BG) = l\left(a * \frac{m_{age}}{age_{th}} - b\right) \quad \text{Equation 2}$$

where, l represents the logistic function:

$$l(x) = \frac{1}{1 + e^{-x}}$$

and where the parameters a and b are pre-determined constants, In one TDBF arrangement, a=20 and b=19. In another TDBF arrangement, a=b=10.

The parameter $age_{th}$ represents a threshold. In one TDBF arrangement, $age_{th}$ is computed using a pre-determined threshold $age_{thmax}$ (units: number of frames) and current frame number $n_f$ as follows:

$$age_{th} = \begin{cases} c * n_f & \text{if } c * n_f < age_{thmax} \\ age_{thmax} & \text{otherwise} \end{cases} \quad \text{Equation 3}$$

Where, c is a pre-defined constant which represents a multiplying factor to determine $age_{th}$ mainly in the start of a video. In one TDBF arrangement, c=15/16;

The probability value P(m==BG) is used to classify the visual element as background and foreground. In one TDBF arrangement, a pre-determined threshold, sensitivity, is used to compare the probability value. If probability value is higher than the sensitivity, the visual element is classified as Background. Alternately, if the probability value is lower than the sensitivity, the visual element is classified as foreground. In one TDBF arrangement sensitivity=0.5.

Case 2: If Matched Mode Boundary Characteristic $m_{bc} \neq -1$

A value of $m_{bc}$ not equal to $-1$ signifies that the mode has been part of a foreground blob at least once in past and the mode boundary characteristic value has been determined. This is in contrast to the case 1 discussed before where $m_{bc}=-1$.

If $m_{bc} \neq -1$, the matched mode's temporal characteristics Cf, Lmf, Mc, and Df and boundary characteristics $m_{bc}$ are used for classification. In one TDBF arrangement, a parameter $boundary_{offset}$ is determined using the mode's boundary characteristic $m_{bc}$. The $boundary_{offset}$ parameter is used along with the mode's age parameter to classify the mode as foreground and background.

The $boundary_{offset}$ parameter is determined as follows:

$$boundary_{offset} = \begin{cases} \left(1 - \frac{m_{bc}}{cs_{th}}\right) * cs_{max} & \text{if } m_{bc} \geq cs_{th} \\ \left(\frac{m_{bc}}{cs_{th}} - 1\right) * cs_{min} & \text{otherwise} \end{cases} \quad \text{Equation 4}$$

Where, $cs_{th}$ represents a pre-determined threshold which is compared to $m_{bc}$. In one TDBF arrangement, $cs_{th}=0.35$.; $cs_{max}$ and $cs_{min}$ represent pre-determined parameters used to control the relative importance of $boundary_{offset}$ compared to the age characteristic of the matched mode in determining the classification.

In this case, equation 2 of calculating a mode to be BG, is modified as follows:

$$P(m == BG) = l\left(a * \frac{m_{age}}{age_{th}} - b + boundary_{offset}\right) \quad \text{Equation 5}$$

To summarize, the output of the step 730 are:
The input superpixel visual element's foreground/background status 731; and
Information 732 about the match mode and whether a new mode needs to be created or not.

After the step 730, the method 700 continues to a decision step 740, performed by the processor 105 executing the TDBF software program 133, which determines if there are more input superpixel visual elements to process. If all input superpixel visual elements have been processed, control follows a YES arrow and the process 700 ends. Otherwise, control follows a NO arrow and processing continues to the step 710. To summarize, the output of the process 700 are:
a) Foreground/background classification 731 of all input superpixel visual elements; and b) Information 732 about the match mode and whether a new mode needs to be created or not for all input visual elements.

Foreground Blob Generation [380]

Returning to FIG. 3, after the scene model matching step 370, the process 300 continues to a step 380, performed by the processor 105 executing the TDBF software program 133, which generates foreground blobs by doing a connected component analysis of all input visual elements which are classified as foreground by the step 370. In one TDBF arrangement, connected component analysis is performed using 4-connected neighbourhoods at visual element level.

Figure 12A:
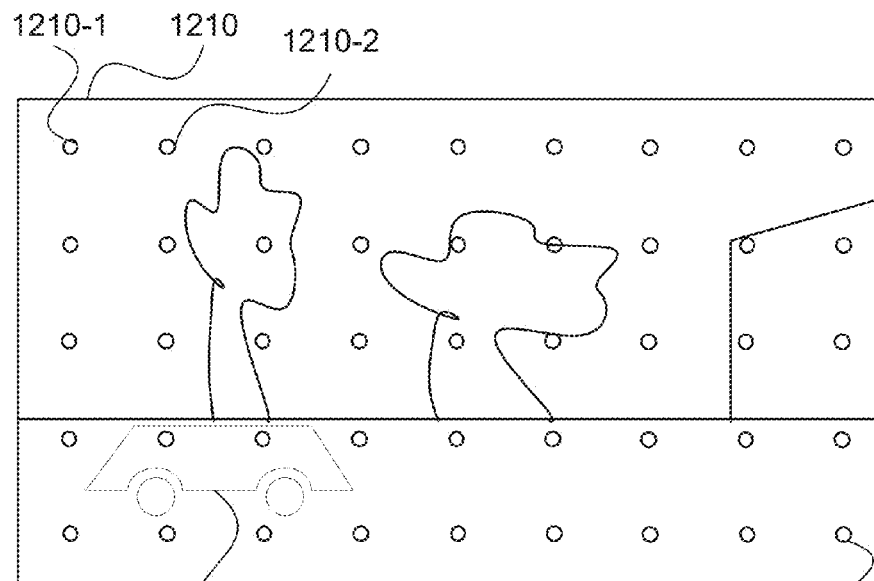
FIG. 12A shows the location of grid based seed points in an example of an input image for a scene.

FIG. 12A shows an example first input image showing a scene 1210 and placement of grid points. The grid points are numbered from 1210-1, 1210-2, along row major order and continue to 1210-45.

Figure 12B:
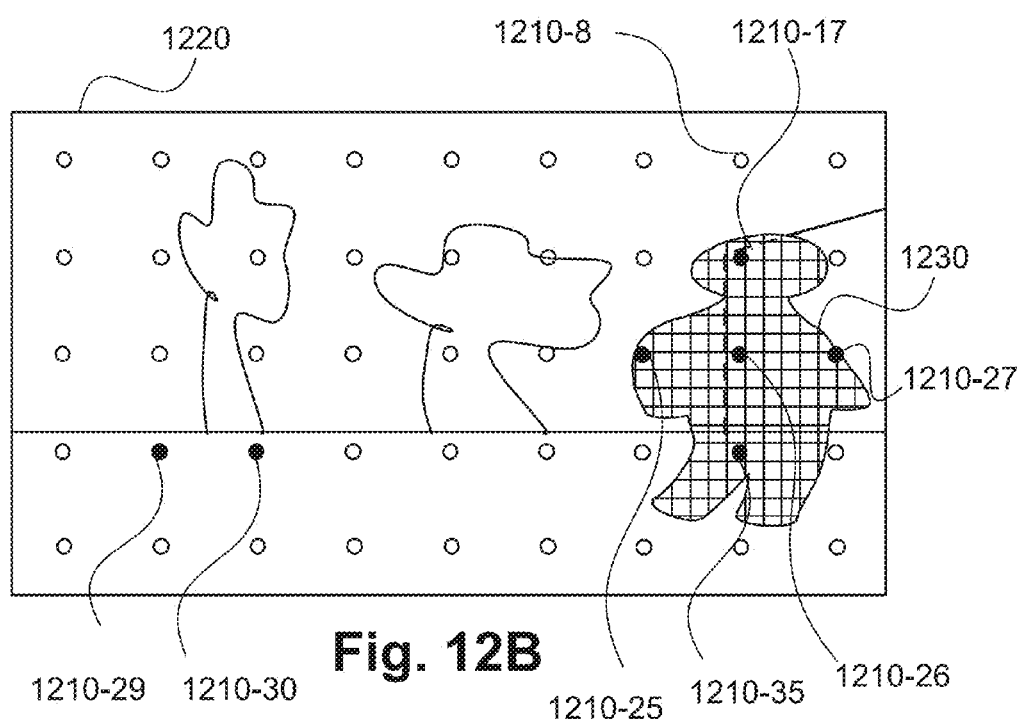
FIG. 12B shows the same scene as FIG. 12A at a later time containing a foreground object shown in cross hatching.

FIG. 12B reference numeral 1220 shows an example of a future frame (for example a frame where n=1000) which occurs after the frame shown n FIG. 12A. The object with reference numeral 1230 is covered (ie occluded) by superpixel visual elements belonging to grid points 1210-17, 1210-25, 1210-26, 1210-27, 1210-25 as shown by dark circled grid points.

Also, an object 1211 as shown in FIG. 12A is missing in FIG. 12B as shown by grid points 1210-29 and 1210-30. Hence, the visual elements corresponding to dark circled grid points are classified as Foreground.

Figures 12C, 12D:
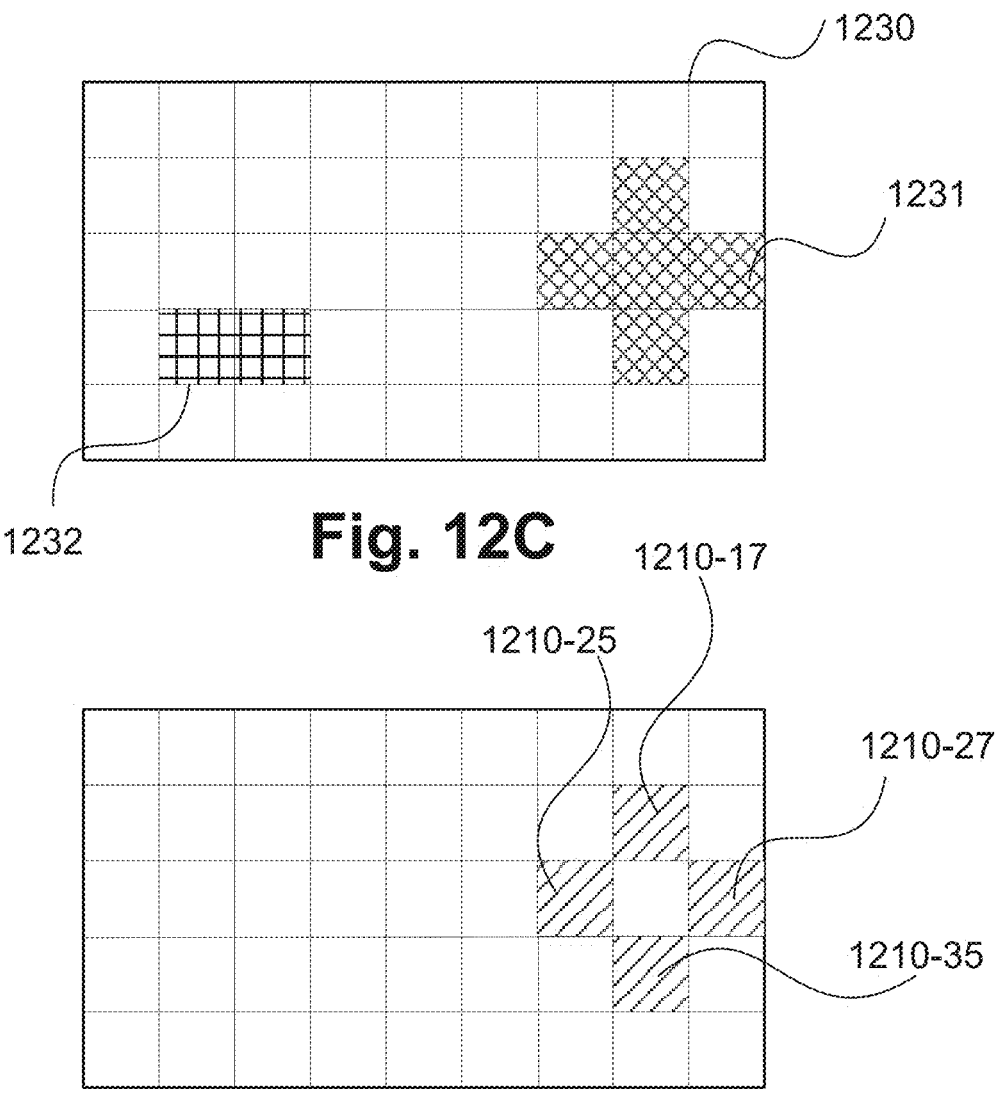
FIG. 12C shows foreground blobs at visual element level for FIG. 12B.
FIG. 12D shows boundary grid points of the foreground blob 1231.

FIG. 12C shows a grid point layout image where each square represents a grid point. The output of connected component analysis for the input image 1220 is the blob segmentation image 1230, comprising blobs 1231 and 1232. Please note that FIG. 12C shows grid points of FIG. 12B. The empty squres correspond to empty circles shown in FIG. 12B and covered squares correspond to filled circles shown in FIG. 12B.

In a TDBF arrangement, the output of the connected component analysis step 380 is an array list 381 consisting of visual elements for each foreground blob. For example:

Blob 1: 1210-17,1210-25,1210-26,1210-27, 1210-35
Blob 2: 1210-29, 1210-30

The step 380 also generates a pixel level foreground segmentation 382 based on foreground/background status decided by the scene model matching step 860. All pixels belonging to superpixel visual elements which have foreground status as determined by the step 380 are marked foreground. Remaining pixels are marked background. A pixel level foreground segmentation mask is output by the step 380 where each pixel of the frame in question is marked as foreground or background.

Scene Model Maintenance [390]

A following step 390, performed by the processor 105 executing the TDBF software program 133, updates the scene model 610 based on scene model matching results 731, 732 from the step 370 and foreground blobs 381 output by the step 380. The step 390 is now explained with reference to the schematic flow chart process 900 presented in FIG. 9.

The update process 900 updates the scene model for each input superpixel visual element such as 314. The process 900 starts with a decision step 910, performed by the processor 105 executing the TDBF software program 133, which determines if there are input superpixel visual elements remaining to be processed. If there are one or more input superpixel visual elements remaining, control follows a NO arrow and processing is directed to a step 920, performed by the processor 105 executing the TDBF software program 133. The step 920 selects an element model set 620-1 (also see 323) corresponding to the next input superpixel visual element which has not been processed for scene model update.

After selecting an element model set in the step 920, processing continues to a decision step 930, performed by the processor 105 executing the TDBF software program 133. The decision step 930 determines if there is a new mode event based on the scene model matching result from the processing step 370 of process 300, for the selected input superpixel visual element. If the scene model matching process has resulted in a new mode creation event for the selected input superpixel visual element, control follows a YES arrow and processing continues to a step 940.

The process 940, performed by the processor 105 executing the TDBF software program 133, creates a new mode 941 at a seed point. To create a new mode, a mode index needs to be identified. Before creating the new mode, the step 940 determines if an inactive mode exists in the selected element model set 323. If an inactive mode exists, a new mode is created by using the input superpixel visual element visual features to initialise visual descriptors of the new mode using the same mode index as the inactive mode. The temporal descriptors and boundary characteristics are initialised as explained before in the scene model initialisation step 350 of the process 300.

If all modes of the selected element model set are active, then a mode is selected for deletion. In one TDBF arrangement, the mode which is marked for earliest deletion based on the temporal descriptor Df is selected and initialised using the input superpixel visual element visual features. The mode index of the deleted mode is used to create a new mode.

After the step 940, the process 900 continues to the decision step 910 to check if more visual elements are available to be processed. If all input visual elements have been processed, control follows a YES arrow and the process 900 continues to a step 960, performed by the processor 105 executing the TDBF software program 133, to update boundary characteristics of all modes.

Returning to the step 930, if a new mode is not required, then control follows a NO arrow and the process 900 continues to a step 950, performed by the processor 105 executing the TDBF software program 133, which updates the existing match mode associated with the selected element model set 323. The step 950 updates the match mode visual and temporal descriptors.

The temporal descriptors are updated using the current temporal characteristics of the mode and the current frame number. The creation time (C) of the mode is unchanged. The match count for the mode is incremented, until a maximum match count is reached. The last match frame for the mode is set to the current frame number. The deletion time for the mode is updated using the deletion time expression shown in equation 1.

The visual descriptor is updated using the input superpixel visual element visual features. In one TDBF arrangement, an approximated median update method is used using a learning rate threshold $LR_{max}$. The parameter $LR_{max}$ represents the maximum change allowed for a mode feature per update. The approximate median filter is explained using the equation shown below:

$$C_v^{t+1} = f(C_v^t, C_I, LR_{max})$$

Where, $C_v^t$ denotes the coefficient value at time t for mode v which is used in the scene matching step 860, $C_v^{t+1}$ represents the updated mode coefficient value which will be used for scene matching in the next frame (at time t+1), $C_I$ represents the coefficient of the corresponding input element in the input frame and f represents the approximated median updating function which can be further elaborated as follows:

$$C_v^{t+1} = \begin{cases} C_v^t + \min(|C_v^t - C_I|, LR_{max}); & \text{if } C_v^t - C_I^1 \geq 0 \\ C_v^t - \min(|C_v^t - C_I|, LR_{max}); & \text{otherwise} \end{cases}$$

Figure 11:
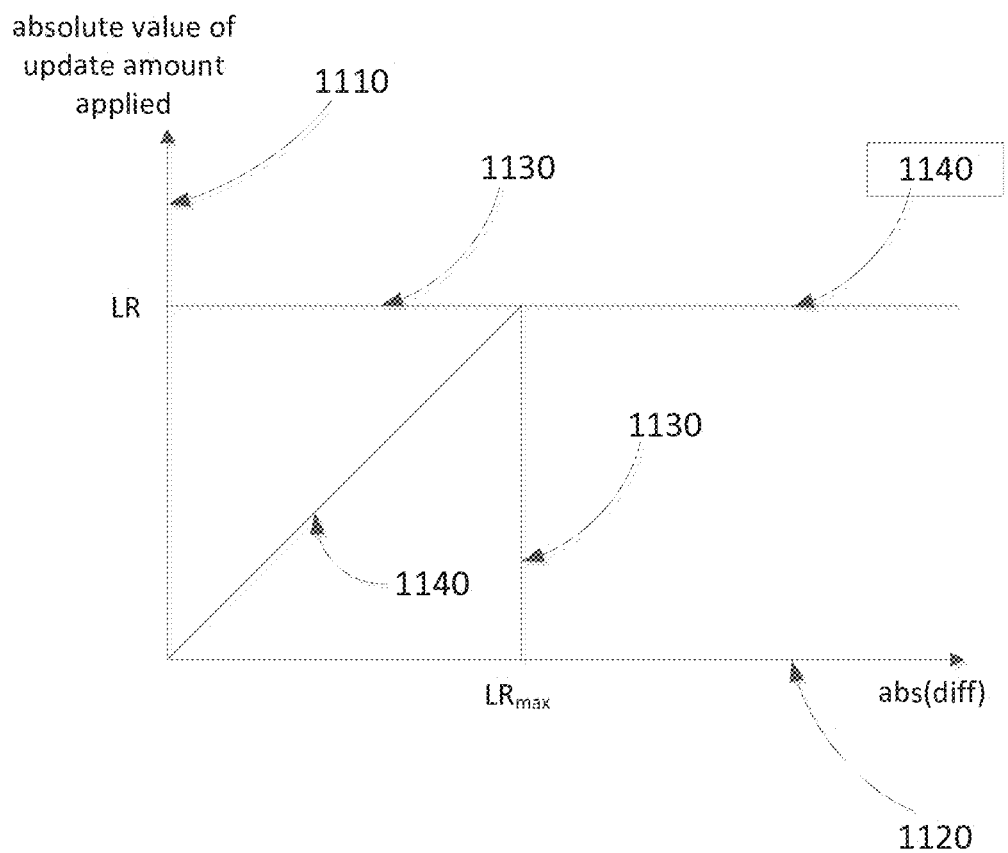
FIG. 11 is a graph that shows how a value of a learning rate threshold $LR_{max}$ controls the maximum change in a visual characteristic value of a mode.

FIG. 11 is a graph that shows how the value of the $LR_{max}$ controls the maximum change in the coefficient value per update. The vertical axis 1110 on the graph is the absolute update amount to be applied to the model value. This amount will be added to the model value (where the input value is greater than the model value) or subtracted from the model value (where the input value is less than the model value). The horizontal axis 1120 on the graph is the absolute difference between the input coefficient value and element model coefficient value (henceforth the absolute difference). The line 1140 is the absolute update amount 1140 applied to the mode coefficient value, for a given absolute difference. When the absolute difference is less than the $LR_{max}$ (ie 1130), the absolute difference is the absolute update amount 1140. When the absolute difference is greater than the $LR_{max}$ (ie 1130), $LR_{max}$ is the absolute update amount 1140.

In contrast, foreground that obscures background can briefly appear as background with a significant change over a small period of time. Therefore, the high learning rate threshold must be limited (that is, not be infinite). In one TDBF arrangement, $LR_{max}=10$ for 8 bit input colour features. This marks the end of the step 950 and processing returns to the decision step 910.

After the step 950, the process 900 continues to the decision step 910 to determine if more visual elements are still to be processed. If all input visual elements have been processed, control follows a YES arrow and the process 900 continues to a step 960, performed by the processor 105 executing the TDBF software program 133, which updates boundary characteristics of all modes in the scene model 610, as described hereinafter in more detail with reference to FIG. 10.

So far, only temporal and visual characteristics of modes have been updated. The step 960 updates boundary characteristics of modes, as described hereinafter in more detail with reference to FIG. 10.

Figure 10:
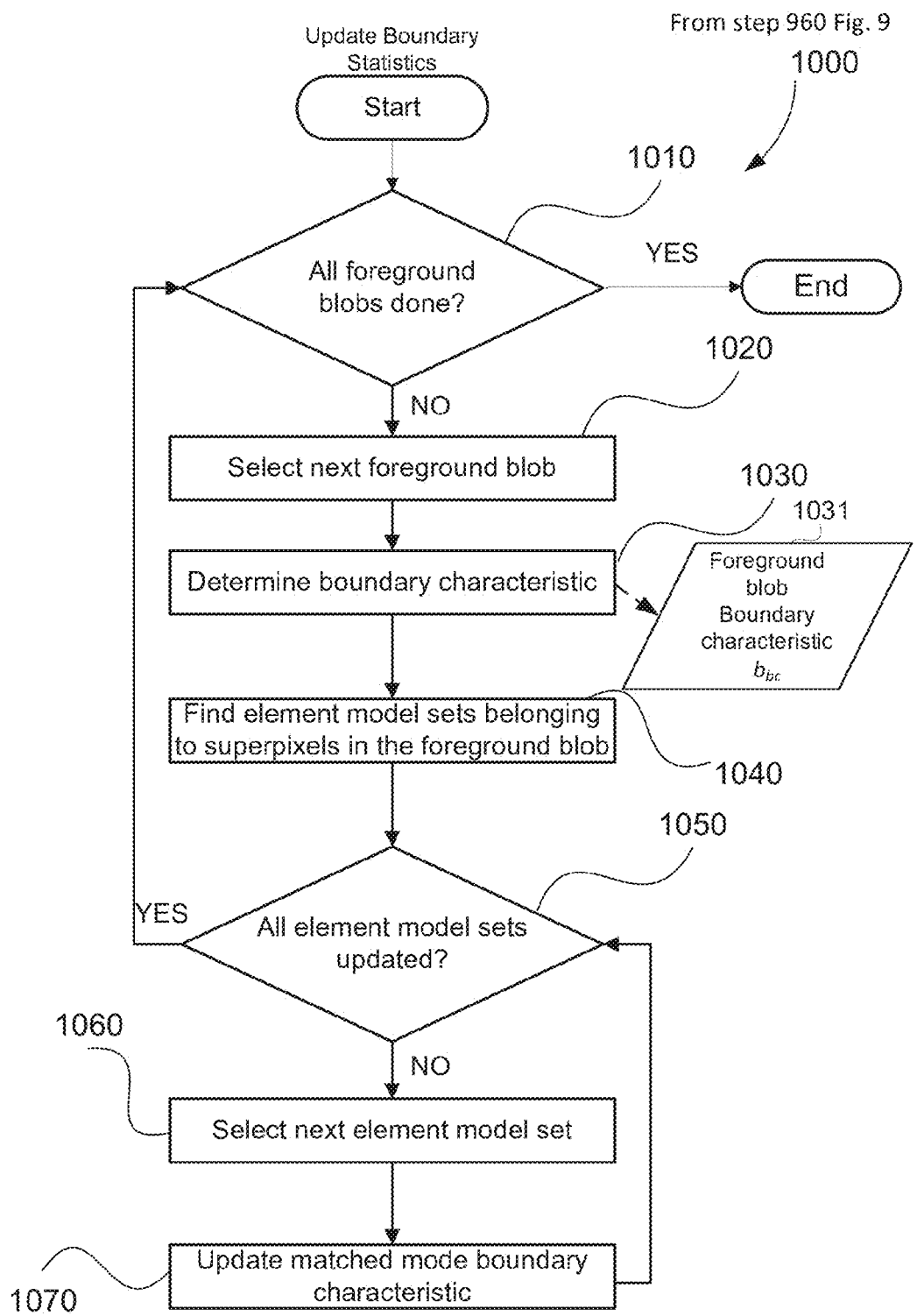
FIG. 10 is a schematic flow diagram illustrating a method of updating mode boundary characteristic of modes.

FIG. 10 presents a flow chart of a process 1000, depicting an example of how the step 960 can be implemented in more detail. The process 1000 starts with decision step 1010, performed by the processor 105 executing the TDBF software program 133, which determines if all foreground blobs output by the step 380 have been processed. If there are still foreground blobs to be processed, control follows a NO arrow and processing goes to a step 1020 which selects a foreground blob to process.

Determine Foreground Blob Boundary Characteristic [1030]

After the step 1020 the process 1000 continues to a step 1030, performed by the processor 105 executing the TDBF software program 133, which generates a foreground blob boundary characteristic ($b_{bc}$). A foreground blob boundary characteristic represents an input image characteristic at the boundary of the foreground blob. In one TDBF arrangement, continuity strength cs is determined as a foreground blob boundary characteristic.

Continuity strength cs signifies how continuous a transition is between two neighbouring visual elements across a boundary visual element of all boundary visual elements belonging to the foreground blob. Let $v_k^b$ be the $k^{th}$ boundary visual element of the foreground blob made up of total K visual elements.

Continuity strength cs is determined by comparing the visual similarity of boundary neighbours of a boundary visual element. Two visual elements are termed boundary neighbours if they have a different classification (one visual element being classified as foreground and another one being classified as background) and are related to the boundary visual element for a given neighbourhood criteria. In one TDBF arrangement, an 4 connected neighbourhood is used. In another TDBF arrangement, an 8 connected neighbourhood is used.

In one TDBF arrangement, continuity strength (cs) is estimated using the following expression:

$$CS = \frac{\sum_1^K VS_p}{N} \qquad \text{Equation 6}$$

Where,

K represents total number of boundary neighbours for all boundary visual elements for the foreground blob.

As an example, the boundary visual elements for the foreground blob 1231 of FIG. 12C are 1201-17, 1210-25, 1210-27, and 1210-35, as shown in FIG. 12D. Please note that FIG. 12D only shows neighbouring visual elements for the foreground blob 1231 of FIG. 12C.

$vs_p$ represents visual similarity between two boundary neighbours of a boundary visual element. For example, for the boundary visual element 1210-17, one boundary pair is [1210-8, 1210-26].

In one TDBF arrangement, visual similarity is estimated using a similar expression to that used for matching an input visual element to a mode. In this case, $vs_p$ is a number between 0 and 1 where 0 represents no similarity at all, while 1 represents exact similarity.

The output of the step 1030 $b_{bc}$ is a number between 0 and 1 signifying the blob boundary characteristic of the foreground blob.

Update Mode Boundary Characteristic [1070]

The step 1030 is followed by a step 1040, performed by the processor 105 executing the TDBF software program 133, which updates boundary characteristics of modes belonging to element model sets corresponding to superpixel visual elements in the foreground blobs. The step 1040 updates match modes of all visual elements which belong to the foreground blob. For example, as shown in FIG. 12C, visual elements 1210-17, 1210-25, 1210-26, 1210-27, 1210-35 belong to the foreground blob 1231. All element model sets' associated with foreground visual elements belonging to the foreground blob are updated.

A following decision step 1050, performed by the processor 105 executing the TDBF software program 133, determines if all element model sets for the current foreground blob have been updated. If all element model sets for the current foreground blob have been updated, control follows a YES arrow and processing continues to the step 1010. If there is an element model set yet to be updated, control follows a NO arrow and processing continues to a step 1060. The step 1060, performed by the processor 105 executing the TDBF software program 133, selects an element model set from the list of remaining element model sets to be updated for the current foreground blob, and continued to a step 1070, performed by the processor 105 executing the TDBF software program 133.

The step 1070 updates the matched mode boundary characteristic of the selected element model set. A mode boundary characteristic $m_{bc}$ is updated using the foreground blob boundary characteristic $b_{bc}$ and the mode's current boundary characteristic. If the mode's boundary characteristic has not been initialised yet i.e. $m_{bc}=-1$, the updated mode's boundary characteristic $m'_{bc}$ depends on the foreground blob boundary characteristic only. In one TDBF arrangement, $m_{bc}$ is initialised as the same value as the blob boundary characteristic i.e. $m'_{bc}=b_{bc}$. If the mode's boundary characteristic is between 0 and 1, then $m_{bc}$ is updated using the foreground blob boundary characteristic and current value of $m_{bc}$. In one TDBF arrangement, $m_{bc}$ is updated using a pre-defined learning rate $\alpha$ as per the following expression:

$$m'_{bc}=\alpha(b_{bc})+(1-\alpha)m_{bc} \qquad \text{Equation 7}$$

Where, $m'_{bc}$ represents the updated mode boundary characteristic, a represents a pre-determined learning rate for mode boundary characteristic (unit: a number between 0 and 1) and $m_{bc}$ represents current mode boundary characteristic.

The learning rate $\alpha$ controls the rate of update of mode's boundary characteristic compared to mode's boundary characteristic. A high value of $\alpha$ will allow fast adaptation to new observations. However, a high value of $\alpha$ will make mode boundary characteristic susceptible to false detections. A low value of $\alpha$ will be robust to false detections but will be slow to adapt to new observations. Hence an appropriate value of learning rate should be used. In one TDBF arrangement, $\alpha=0.35$ is selected.

A blob such as 1232 will have high boundary characteristic $b_{bc}$ (ie continuity strength cs) due to similarity in boundary visual elements. High boundary characteristic will eventually increase the parameter boundary$_{offset}$ used in Equation 5 and will help revealed background region to be classified as background quickly.

A blob such as 1231 will have a low value for the boundary characteristic due to less similarity in boundary visual elements. If the object 1231 continues to stay in the same position as shown in FIG. 12B, then a negative boundary$_{offset}$ (from Equation 4) will help to continue to detect the object as foreground longer.

After finishing the step 1070, process 1000 continues to the decision step 1050 to check if all element model sets have been updated. If all element model sets have been updated then processing continues to the step 1010 to check if there are more foreground blobs to be processed.

The Process 1000 finishes if all foreground blobs have been processed and processing returns to the process 900.

The process 900 also finishes when boundary characteristics of all element model sets have been updated and processing returns to the process 300.

At the process 300, processing continues to the decision step 3100 to check if there are more frames to processed. If there are more frames, control follows a YES arrow and processing continues to the step 310 or else control follows a NO arrow and the method 300 ends.

INDUSTRIAL APPLICABILITY

The arrangements described are applicable to the computer and data processing industries and particularly for the video object detection applications, particularly those that seek to distinguish background and foreground. This is particularly useful in video surveillance systems and more specifically for handling revealed background and background merging scenarios robustly. This can include scenarios in which an object was initially occluding a part of background and was removed in future revealing background. A background merging scenario may happen if a foreground object such as a bus stays in a position e.g. bus stop for a long time. Taking a foreground blob boundary characteristic as scene model information helps in adaptive speedup or delay of a foreground object depending on object boundary characteristics and collective evidence across multiple frames. As such, surveillance cameras configured according to the present disclosure can operate to better discriminate foreground from background.

The foregoing describes only some embodiments of the present invention, and modifications and/or changes can be made thereto without departing from the scope and spirit of the invention, the embodiments being illustrative and not restrictive.

The invention claimed is:

1. A method for classifying a visual element as either foreground or background in a video frame, the method comprising the steps of:
   computing a blob boundary characteristic for a blob obtained from the video frame which is captured by a camera module including a processor and a memory storing a computer executable software program for directing the processor to compute the blob boundary characteristic, wherein said blob comprises at least one visual element corresponding to a scene model which comprises a plurality of modes, and said visual element is labelled foreground based on at least a match mode boundary characteristic in the scene model; and
   updating the scene model based on at least the computed blob boundary characteristic and the match mode boundary characteristic.

2. A method for classifying a visual element in a video frame as either foreground or background, the video frame being characterised using a scene model comprising a plurality of modes, the method comprising the steps of:
   determining a blob boundary characteristic ($b_{bc}$) for a blob comprising at least the visual element, the blob being obtained from the video frame which is captured by a camera module including a processor and a memory storing a computer executable software program for directing the processor to determine the blob boundary characteristic;
   identifying a mode matched to the visual element;
   classifying the visual element as foreground dependent upon a match mode boundary characteristic ($m_{bc}$) of the matched mode; and
   updating the scene model dependent upon the blob boundary characteristic ($b_{bc}$) and the matched mode boundary characteristic ($m_{bc}$).

3. The method according to claim 2, wherein determining the blob boundary characteristic comprises determining a gradient across a boundary between the visual element of the blob and a neighbouring visual element.

4. The method according to claim 2, wherein identifying the mode matched to the visual element comprises the steps of:
   comparing visual descriptors of modes in the scene model against a visual feature of the visual element;
   determining a match score for each comparison; and
   identifying the mode matched to the visual element as the mode having the highest match score.

5. The method according to claim 2, wherein classifying the visual element as foreground comprises the steps of:

determining a probability that the visual element is foreground dependent upon a value of the match mode boundary characteristic over time; and classifying the visual element as foreground dependent upon the probability and a threshold.

6. An apparatus for classifying a visual element in a video frame as either foreground or background, the video frame being characterised using a scene model comprising a plurality of modes, the apparatus comprising:
   a camera module for capturing the video frame;
   a processor; and
   a memory storing a computer executable software program for directing the processor to perform a method comprising the steps of:
   determining a blob boundary characteristic for a blob comprising at least the visual element;
   identifying a mode matched to the visual element;
   classifying the visual element and the matched mode as foreground dependent upon a match mode boundary characteristic of the matched mode; and
   updating the scene model dependent upon the blob boundary characteristic and the matched mode boundary characteristic.

7. A non-transitory computer readable memory medium storing a computer executable software program for directing a processor to perform a method for classifying a visual element in a video frame as either foreground or background, the video frame being characterised using a scene model comprising a plurality of modes, the method comprising the steps of:
   determining a blob boundary characteristic for a blob comprising at least the visual element;
   identifying a mode matched to the visual element;
   classifying the visual element and the matched mode as foreground dependent upon a match mode boundary characteristic of the matched mode; and
   updating the scene model dependent upon the blob boundary characteristic and the matched mode boundary characteristic.

8. A method for classifying, using a scene model, at least one visual element as either foreground or background in a video frame, the method comprising the steps of:
   classifying, using the scene model, a blob including the at least one visual element as either foreground or background, the scene model including a boundary characteristic;
   determining a boundary characteristic of the blob classified as foreground; and
   updating, on a basis of the determined boundary characteristic of the blob, the boundary characteristic of the scene model corresponding to the at least one visual element included in the blob.

9. The method according to claim 8, wherein determining the boundary characteristic of the blob comprises determining a gradient across a boundary between the visual element included in the blob and a neighbouring visual element not included in the blob.

10. An apparatus for classifying, using a scene model, at least one visual element as either foreground or background in a video frame, the apparatus comprising a memory storing instructions that, when executed by one or more processors of the apparatus, cause the apparatus to perform operations comprising:
    classifying, using the scene model, a blob including the at least one visual element as either foreground or background, the scene model including a boundary characteristic;
    determining a boundary characteristic of the blob classified as foreground; and
    updating, on a basis of the determined boundary characteristic of the blob, the boundary characteristic of the scene model corresponding to the at least one visual element included in the blob.

11. A non-transitory computer readable memory medium storing a computer executable software program for directing a processor to perform a method for classifying a visual element in a video frame as either foreground or background, the method comprising the steps of:
    classifying, using a scene model, a blob including the at least one visual element as either foreground or background, the scene model including a boundary characteristic;
    determining a boundary characteristic of the blob classified as foreground; and
    updating, on a basis of the determined boundary characteristic of the blob, the boundary characteristic of the scene model corresponding to the at least one visual element included in the blob.

12. A method for classifying at least one visual element in video frames, the method comprising the steps of:
    segmenting an input video frame into a plurality of visual elements based on pixel values;
    determining, for each of the plurality of visual elements, a temporal characteristic of a visual element;
    determining a boundary characteristic of a blob including the visual element; and
    classifying the visual element as either foreground or background based on the temporal characteristic of the visual element and the boundary characteristic of the blob including the visual element.

13. The method according to claim 12, wherein determining the boundary characteristic of the blob comprises determining continuity of pixel values across a boundary of the blob.

14. The method according to claim 13, wherein the temporal characteristic includes a parameter which prescribes a duration time of the visual element.

15. The method according to claim 12, wherein classifying the visual element comprises determining a probability of a case that the visual element belongs to the background, and the probability becomes greater as strength of the continuity of pixel values across the boundary becomes higher.

16. The method according to claim 12, wherein in classifying the visual element, it takes a longer duration time for the visual element to be classified as the background, if strength of the continuity of pixel values across the boundary is high.

17. An apparatus for classifying at least one visual element in video frames, the apparatus comprising a memory storing instructions that, when executed by one or more processors of the apparatus, cause the apparatus to perform operations comprising:
    segmenting an input video frame into a plurality of visual elements based on pixel values;
    determining, for each of the plurality of visual elements, a temporal characteristic of a visual element;
    determining a boundary characteristic of a blob including the visual element; and
    classifying the visual element as either foreground or background based on the temporal characteristic of the visual element and the boundary characteristic of the blob including the visual element.

18. A non-transitory computer readable memory medium storing a computer executable software program for directing a processor to perform a method for classifying at least one visual element in video frames, the method comprising the steps of:
- segmenting an input video frame into a plurality of visual elements based on pixel values;
- determining, for each of the plurality of visual elements, a temporal characteristic of a visual element;
- determining a boundary characteristic of a blob including the visual element; and
- classifying the visual element as either foreground or background based on the temporal characteristic of the visual element and the boundary characteristic of the blob including the visual element.

* * * * *